(12) United States Patent
Pongo et al.

(10) Patent No.: US 11,897,493 B2
(45) Date of Patent: Feb. 13, 2024

(54) ANTI-LOCK BRAKING SYSTEM FOR UTILITY VEHICLE

(71) Applicant: Polaris Industries Inc., Medina, MN (US)

(72) Inventors: Harry Pongo, Gatzke, MN (US); Brian E. Brandt, Roseau, MN (US); Joshua T. Weed, Forest Lake, MN (US); Agata Kaleta, Opolskie (PL); Jacob J. Minick, Minneapolis, MN (US); Ryan D. Kincade, Columbus, MN (US)

(73) Assignee: Polaris Industries Inc., Medina, MN (US)

(*) Notice: Subject to any disclaimer, the term of this patent is extended or adjusted under 35 U.S.C. 154(b) by 221 days.

(21) Appl. No.: 17/193,504

(22) Filed: Mar. 5, 2021

(65) Prior Publication Data
US 2021/0261147 A1 Aug. 26, 2021

Related U.S. Application Data

(63) Continuation of application No. 16/197,497, filed on Nov. 21, 2018, now Pat. No. 10,967,881.
(Continued)

(51) Int. Cl.
*B60W 50/12* (2012.01)
*B60W 40/10* (2012.01)
(Continued)

(52) U.S. Cl.
CPC .............. *B60W 50/12* (2013.01); *B60T 8/32* (2013.01); *B60W 30/18109* (2013.01);
(Continued)

(58) Field of Classification Search
CPC ........... B60W 50/12; B60W 30/18109; B60W 40/10; B60W 2050/146; B60W 2510/18;
(Continued)

(56) References Cited

U.S. PATENT DOCUMENTS

| 4,421,359 A | 12/1983 | Hayashi et al. |
| 4,456,310 A | 6/1984 | Hayashi et al. |

(Continued)

FOREIGN PATENT DOCUMENTS

| CN | 1935589 A | 3/2007 |
| CN | 101263035 A | 9/2008 |

(Continued)

OTHER PUBLICATIONS

Ihle Klaus Dieter, Jan. 28, 1999, English Machine Translation_ DE19731650A1 provided by Patent Translate by EPO and Google (Year: 1999).*

(Continued)

*Primary Examiner* — Peter D Nolan
*Assistant Examiner* — Ashley L Redhead, Jr.
(74) *Attorney, Agent, or Firm* — Faegre Drinker Biddle & Reath LLP

(57) ABSTRACT

A utility vehicle includes a frame and a plurality of ground-engaging members supporting the frame. Each of the plurality of ground-engaging members is configured to rotate about an axle. The utility vehicle further includes a powertrain assembly supported by the frame and a braking system configured to operate in a normal run mode and an anti-lock braking mode. The braking system includes an anti-lock braking control module operably coupled to the plurality of ground-engaging members and configured to automatically engage the anti-lock braking mode in response to a predetermined condition.

16 Claims, 22 Drawing Sheets

Related U.S. Application Data

(60) Provisional application No. 62/590,041, filed on Nov. 22, 2017.

(51) Int. Cl.
  *B60W 30/18* (2012.01)
  *B60T 8/32* (2006.01)
  *B60W 50/14* (2020.01)

(52) U.S. Cl.
  CPC ....... *B60W 40/10* (2013.01); *B60W 2050/146* (2013.01); *B60W 2510/18* (2013.01); *B60W 2520/28* (2013.01)

(58) Field of Classification Search
  CPC ............. B60W 2520/28; B60W 10/18; B60W 10/184; B60W 2300/18; B60W 2300/185; B60W 2300/43; B60T 8/32
  See application file for complete search history.

(56) References Cited

U.S. PATENT DOCUMENTS

| | | | |
|---|---|---|---|
| 4,465,322 A | 8/1984 | Hayashi | |
| 4,494,800 A | 1/1985 | Hayashi | |
| 4,697,825 A | 10/1987 | Hayashi et al. | |
| 4,702,339 A | 10/1987 | Hayashi et al. | |
| 4,733,757 A | 3/1988 | Hayashi et al. | |
| 4,766,982 A | 8/1988 | Hayashi et al. | |
| 4,770,473 A | 9/1988 | Tsuchida | |
| 4,852,701 A | 8/1989 | Wakatsuki | |
| 4,865,399 A | 9/1989 | Atkins et al. | |
| 4,943,922 A | 7/1990 | Tanaka | |
| 4,976,501 A | 12/1990 | Sivulka et al. | |
| 5,195,717 A | 3/1993 | Benz et al. | |
| 5,273,346 A | 12/1993 | Tsuchida et al. | |
| 5,344,220 A | 9/1994 | Roll et al. | |
| 5,445,443 A | 8/1995 | Hauser et al. | |
| 5,586,814 A | 12/1996 | Steiner | |
| 5,615,934 A | 4/1997 | Abuelsamid | |
| 5,727,852 A | 3/1998 | Pueschel et al. | |
| 5,730,256 A | 3/1998 | Namngani | |
| 5,797,664 A * | 8/1998 | Tagawa | B60T 8/1769 303/190 |
| 5,918,948 A | 7/1999 | Burgdorf et al. | |
| 6,142,583 A | 11/2000 | Steffes | |
| 6,273,523 B1 | 8/2001 | Wakabayashi et al. | |
| 6,419,329 B1 | 7/2002 | Buschmann et al. | |
| 6,490,518 B1 | 12/2002 | Walenty et al. | |
| 6,652,039 B1 | 11/2003 | Shull et al. | |
| 6,923,514 B1 | 8/2005 | Spieker et al. | |
| 7,219,965 B2 | 5/2007 | Wagner | |
| 7,350,881 B2 | 4/2008 | Asahi | |
| 7,611,212 B2 | 11/2009 | Nakayama et al. | |
| 7,695,074 B2 | 4/2010 | Pongo | |
| 7,918,301 B2 | 4/2011 | Ito et al. | |
| 8,002,066 B2 | 8/2011 | Harada | |
| 8,140,236 B2 | 3/2012 | Eckert et al. | |
| 8,186,470 B2 | 5/2012 | Matayoshi | |
| 8,439,455 B2 | 5/2013 | Hayashi et al. | |
| 8,616,324 B2 | 12/2013 | Chipp | |
| 8,633,611 B2 | 1/2014 | Waida et al. | |
| 8,651,213 B2 | 2/2014 | Nagakubo et al. | |
| 8,887,859 B2 | 11/2014 | Matsushima | |
| 8,933,797 B2 | 1/2015 | Deigmoller et al. | |
| 8,965,691 B1 * | 2/2015 | Lombrozo | G01P 13/04 701/41 |
| 8,973,696 B2 | 3/2015 | Hamauzu et al. | |
| 9,010,475 B2 | 4/2015 | Nagai et al. | |
| 9,022,157 B2 | 5/2015 | Konno et al. | |
| 9,033,429 B2 | 5/2015 | Waida et al. | |
| 9,085,287 B2 | 7/2015 | Moore et al. | |
| 9,120,520 B2 | 9/2015 | Miyamoto et al. | |
| 9,132,813 B2 | 9/2015 | Matsuda | |
| 9,156,453 B2 | 10/2015 | Takatsuka et al. | |
| 9,260,058 B2 | 2/2016 | Takasaki et al. | |
| 9,771,055 B1 * | 9/2017 | Zhang | B60T 8/17558 |
| 10,272,925 B1 * | 4/2019 | Wicks | B60W 10/02 |
| 2001/0030464 A1 | 10/2001 | Kouauki | |
| 2002/0088661 A1 | 7/2002 | Gagnon et al. | |
| 2003/0004632 A1 | 1/2003 | Walenty et al. | |
| 2004/0239180 A1 | 12/2004 | Foust | |
| 2005/0134114 A1 | 6/2005 | Asahi | |
| 2005/0146207 A1 | 7/2005 | Wagner | |
| 2005/0228568 A1 | 10/2005 | Hack et al. | |
| 2006/0175895 A1 | 8/2006 | Mahlo et al. | |
| 2007/0075582 A1 | 4/2007 | Nakayama et al. | |
| 2007/0145227 A1 | 6/2007 | Hasegawa | |
| 2007/0200430 A1 | 8/2007 | Tani | |
| 2009/0118961 A1 | 5/2009 | Eckert et al. | |
| 2009/0243378 A1 | 10/2009 | Ito et al. | |
| 2010/0000818 A1 | 1/2010 | Fukuyama et al. | |
| 2011/0082634 A1 * | 4/2011 | Povirk | F16H 48/30 701/88 |
| 2011/0232987 A1 | 9/2011 | Chipp | |
| 2011/0256981 A1 * | 10/2011 | Saito | B60W 30/192 477/183 |
| 2011/0315459 A1 | 12/2011 | Zuchoski et al. | |
| 2012/0150409 A1 | 6/2012 | Ogawa et al. | |
| 2012/0186895 A1 | 7/2012 | Hamauzu et al. | |
| 2012/0200148 A1 | 8/2012 | Waida et al. | |
| 2012/0211295 A1 | 8/2012 | Nagai et al. | |
| 2012/0247858 A1 | 10/2012 | Konno et al. | |
| 2013/0009378 A1 | 1/2013 | Nagakubo et al. | |
| 2013/0066533 A1 | 3/2013 | Moore et al. | |
| 2013/0110359 A1 | 5/2013 | Febrer et al. | |
| 2013/0138316 A1 * | 5/2013 | Koyama | B60T 8/1755 701/70 |
| 2013/0180605 A1 | 7/2013 | Matsushima | |
| 2013/0226408 A1 * | 8/2013 | Fung | B60K 28/06 701/1 |
| 2014/0032093 A1 * | 1/2014 | Mills | B60W 40/10 701/301 |
| 2014/0062048 A1 | 3/2014 | Schlangen et al. | |
| 2015/0041232 A1 | 2/2015 | Takatsuka et al. | |
| 2015/0096819 A1 | 4/2015 | Grajkowski et al. | |
| 2015/0191161 A1 | 7/2015 | Sagayama et al. | |
| 2015/0203117 A1 * | 7/2015 | Kelly | F16H 61/0213 701/91 |
| 2015/0321648 A1 * | 11/2015 | Adeeb | B60T 13/686 701/70 |
| 2015/0360655 A1 * | 12/2015 | Odate | B60W 10/18 701/70 |
| 2016/0047450 A1 | 2/2016 | Steidl et al. | |
| 2016/0185216 A1 * | 6/2016 | Clarke | B60K 6/52 74/665 F |
| 2017/0072953 A1 * | 3/2017 | Nemoto | B60W 30/16 |
| 2018/0156329 A1 * | 6/2018 | Hose | B60W 30/18118 |
| 2018/0273051 A1 * | 9/2018 | Amato | G06V 10/22 |
| 2018/0281764 A1 | 10/2018 | Pongo et al. | |
| 2018/0304893 A1 * | 10/2018 | Hall | B60W 30/182 |
| 2019/0152493 A1 | 5/2019 | Pongo et al. | |
| 2020/0031334 A1 * | 1/2020 | Woodley | B60T 8/1761 |
| 2020/0231155 A1 * | 7/2020 | Ogawa | B60K 17/348 |
| 2020/0317194 A1 * | 10/2020 | Yan | B60W 30/143 |

FOREIGN PATENT DOCUMENTS

| | | | |
|---|---|---|---|
| CN | 101643006 A | 2/2010 | |
| CN | 102730122 A | 10/2012 | |
| CN | 202686337 U | 1/2013 | |
| CN | 103158692 A | 6/2013 | |
| CN | 103287409 A | 9/2013 | |
| CN | 204845911 U | 12/2015 | |
| DE | 3803563 A1 | 8/1989 | |
| DE | 3901923 A1 | 9/1990 | |
| DE | 4329140 C1 | 12/1994 | |
| DE | 4330121 A1 | 3/1995 | |
| DE | 19501760 A1 | 7/1996 | |
| DE | 19613903 A1 | 10/1997 | |
| DE | 19731650 A1 * | 1/1999 | ............... B60T 8/32 |
| DE | 19731650 A1 | 1/1999 | |
| DE | 102004034226 A1 | 3/2005 | |

(56) References Cited

FOREIGN PATENT DOCUMENTS

| | | |
|---|---|---|
| DE | 102010031140 A1 | 1/2012 |
| EP | 0175843 A2 | 4/1986 |
| EP | 0422515 A2 | 4/1991 |
| EP | 1568561 A1 | 8/2005 |
| EP | 1679243 A1 | 7/2006 |
| EP | 1783018 A1 | 5/2007 |
| EP | 1842755 A1 | 10/2007 |
| EP | 2075168 A2 | 7/2009 |
| EP | 2075169 A2 | 7/2009 |
| EP | 2213536 A1 | 8/2010 |
| EP | 2216218 A1 | 8/2010 |
| EP | 2284071 A1 | 2/2011 |
| EP | 2311704 A1 | 4/2011 |
| EP | 2540587 A1 | 1/2013 |
| EP | 2548792 A1 | 1/2013 |
| EP | 2565090 A1 | 3/2013 |
| EP | 2574511 A1 | 4/2013 |
| EP | 2591962 A1 | 5/2013 |
| EP | 2765068 A1 | 8/2014 |
| EP | 2868958 A1 | 5/2015 |
| EP | 2915729 A1 | 9/2015 |
| EP | 2977281 A1 | 1/2016 |
| ID | 201202332 | 10/2011 |
| ID | 201303965 | 11/2012 |
| IN | 201103052 | 1/2013 |
| IN | 201002229 | 10/2013 |
| IN | 201202995 | 4/2014 |
| IN | 201202996 | 4/2014 |
| IN | 201203002 | 4/2014 |
| IN | 201500699 | 1/2016 |
| JP | 11-314589 A | 11/1999 |
| JP | 11-314590 A | 11/1999 |
| JP | 11-314591 A | 11/1999 |
| JP | 2000-006779 A | 1/2000 |
| JP | 2000-142343 A | 5/2000 |
| JP | 2001-253383 A | 9/2001 |
| JP | 2001-260848 A | 9/2001 |
| JP | 2002-029403 A | 1/2002 |
| JP | 2002-067913 A | 3/2002 |
| JP | 2005-059629 A | 3/2005 |
| JP | 2005-178632 A | 7/2005 |
| JP | 2005-238901 A | 9/2005 |
| JP | 2006-175993 A | 7/2006 |
| JP | 2006-192980 A | 7/2006 |
| JP | 2007-008375 A | 1/2007 |
| JP | 2007-069870 A | 3/2007 |
| JP | 2007-076555 A | 3/2007 |
| JP | 2007-112155 A | 5/2007 |
| JP | 2007-296908 A | 11/2007 |
| JP | 2010-013067 A | 1/2010 |
| JP | 2010-058699 A | 3/2010 |
| JP | 2010-076511 A | 4/2010 |
| JP | 4451302 B2 | 4/2010 |
| JP | 2011-051417 A | 3/2011 |
| JP | 2011-051433 A | 3/2011 |
| JP | 2011-079351 A | 4/2011 |
| JP | 2011-088631 A | 5/2011 |
| JP | 4739156 B2 | 8/2011 |
| JP | 2012-096753 A | 5/2012 |
| JP | 2012-210891 A | 11/2012 |
| JP | 2012-245843 A | 12/2012 |
| JP | 2013-014199 A | 1/2013 |
| JP | 2013-071589 A | 4/2013 |
| JP | 5189337 B2 | 4/2013 |
| JP | 2013-103524 A | 5/2013 |
| JP | 2013-103693 A | 5/2013 |
| JP | 2013-136356 A | 7/2013 |
| JP | 2014-031138 A | 2/2014 |
| JP | 2014-148308 A | 8/2014 |
| JP | 5667542 B2 | 2/2015 |
| JP | 5685172 B2 | 3/2015 |
| JP | 5715536 B2 | 5/2015 |
| JP | 5751989 B2 | 7/2015 |
| JP | 5764025 B2 | 8/2015 |
| JP | 2015-178335 A | 10/2015 |
| JP | 5816715 B2 | 11/2015 |
| JP | 5882803 B2 | 3/2016 |
| JP | 2016-137872 A | 8/2016 |
| JP | 5972706 B2 | 8/2016 |
| KR | 10-1479827 B1 | 1/2015 |
| WO | 96/02409 A1 | 2/1996 |
| WO | 2004/002769 A1 | 1/2004 |
| WO | 2004/022395 A1 | 3/2004 |
| WO | 2011/027441 A1 | 3/2011 |
| WO | 2018/183452 A1 | 10/2018 |

OTHER PUBLICATIONS

International Preliminary Report on Patentability issued by the International Preliminary Examining Authority, dated Jan. 30, 2020, for International Patent Application No. PCT/US2018/062179; 18 pages.

International Search Report and Written Opinion received for PCT Patent Application No. PCT/US2018/062179, dated Feb. 13, 2019, 17 pages.

International Search Report, dated Jul. 24, 2018, for International Patent Application No. PCT/US2018/024775; 4 pages.

Written Opinion of the International Searching Authority dated Jul. 24, 2018, for International Patent Application No. PCT/US2018/024775; 6 pages.

Office Action issued by the Canadian Intellectual Property Office, dated Feb. 3, 2022, for Canadian Patent Application No. 3,084,577; 3 pages.

* cited by examiner

ANTI-LOCK BRAKING SYSTEM FOR UTILITY VEHICLE

CROSS-REFERENCE TO RELATED APPLICATIONS

The present application is a continuation of U.S. patent application Ser. No. 16/197,497, filed Nov. 21, 2018, which claims the benefit of U.S. Provisional Patent Application Ser. No. 62/590,041, filed Nov. 22, 2017, both entitled "ANTI-LOCK BRAKING SYSTEM FOR UTILITY VEHICLE," the entirety of which is hereby incorporated herein by reference.

TECHNICAL FIELD OF THE DISCLOSURE

The present application relates to a braking system for a vehicle and, more particularly, to an anti-lock braking system for a utility vehicle configured for off-road applications.

BACKGROUND OF THE DISCLOSURE

Anti-lock braking systems ("ABS") may be used on vehicles to facilitate braking power in response to a user input. For example, the user may depress a brake pedal, thereby enabling the ABS to facilitate braking of the vehicle. The ABS may be configured to facilitate braking of the front wheels, the rear wheels, or both the front and rear wheels.

In some embodiments, it may be possible to disengage the ABS. However, if a user disengages or turns off the ABS, then the user may have to remember to manually re-engage or turn on the ABS when needed. In such instances, the user must be sufficiently cognizant of the terrain, driving, and other conditions to recognize that the ABS should be turned on before it is needed. As such, there is a need for a system which may automatically engage or turn on the ABS in response to a predetermined driving condition.

SUMMARY OF THE DISCLOSURE

In one embodiment, a utility vehicle comprises a frame and a plurality of ground-engaging members supporting the frame. Each of the plurality of ground-engaging members is configured to rotate about an axle. The utility vehicle further comprises a powertrain assembly supported by the frame and a braking system configured to operate in a normal run mode and an anti-lock braking mode. The braking system comprises an anti-lock braking control module operably coupled to the plurality of ground-engaging members and configured to automatically engage the anti-lock braking mode in response to a predetermined condition.

In another embodiment, a braking assembly for a utility vehicle configured to operate in a normal run mode and an anti-lock braking mode is disclosed. The braking assembly comprises a user braking member, a plurality of brake calipers operably coupled to the user braking member, a junction member operably coupled to at least two of the plurality of brake calipers, and an anti-lock braking control module operably coupled to at least the user braking member and junction member. The anti-lock braking control module is configured to automatically engage the anti-lock braking mode at a predetermined condition and disengage the anti-lock braking mode in response to a user input.

In yet another embodiment, a method of operating a braking assembly of a utility vehicle in one of a normal run mode and an anti-lock braking mode comprises providing a user braking member, providing a plurality of brake calipers operably coupled to the user braking member, providing an anti-lock braking control module operably coupled to the user braking member and the plurality of brake calipers, and automatically engaging the anti-lock braking mode at a predetermined condition.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
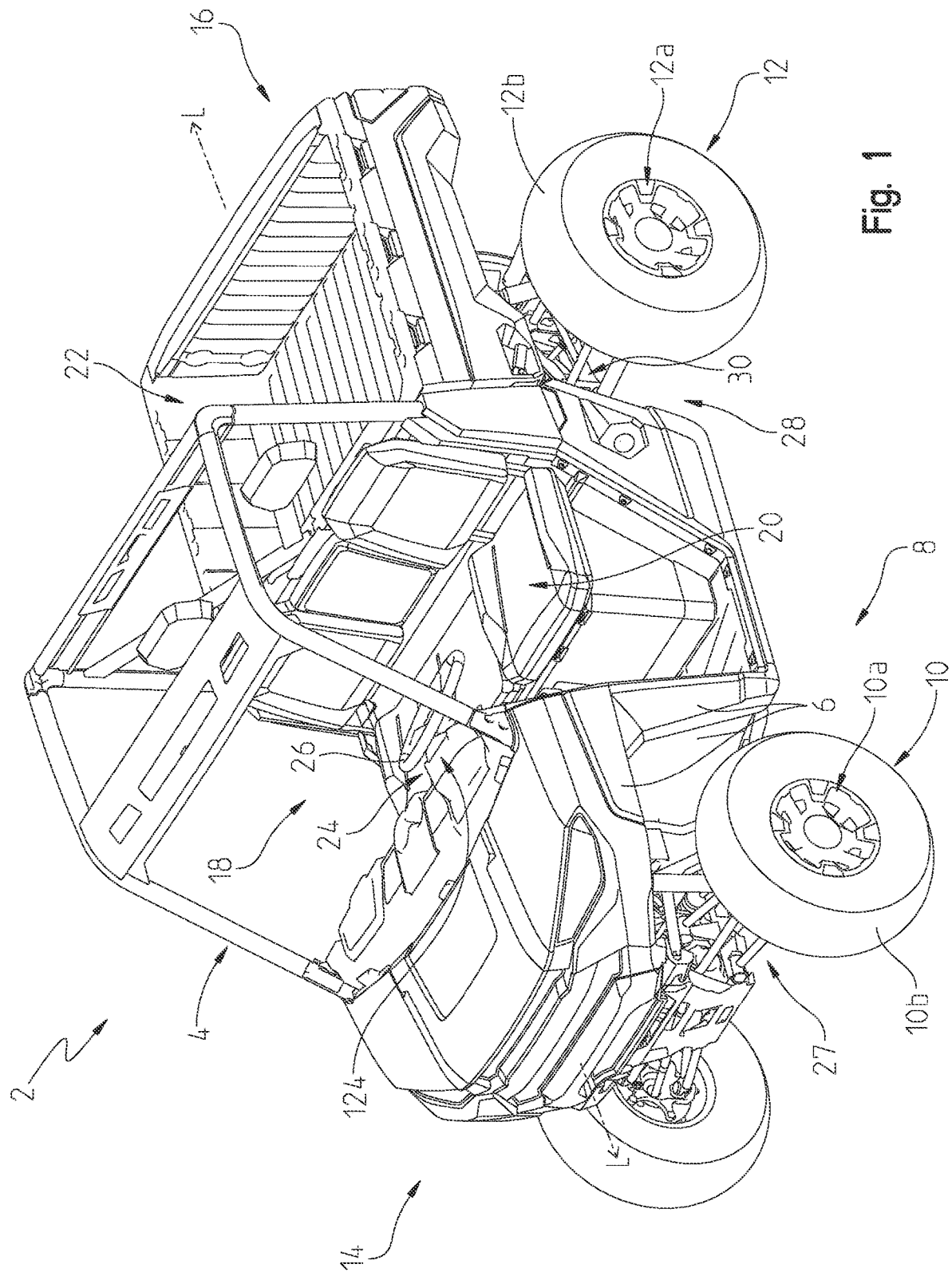
FIG. 1 is a left front perspective view of a utility vehicle of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

As shown in FIG. 1, a utility vehicle 2 is disclosed and configured for off-road vehicle applications, such that utility vehicle 2 is configured to traverse trails and other off-road terrain. Utility vehicle 2 includes a frame assembly 4 which supports a plurality of body panels 6 and is supported on a ground surface by a plurality of ground-engaging members 8. Illustratively, ground-engaging members 8 include front ground-engaging members 10 and rear ground-engaging members 12. In one embodiment of vehicle 2, each of front ground-engaging members 10 include a wheel assembly 10a and a tire 10b supported thereon. Similarly, each of rear ground-engaging members 12 may include a wheel assembly 12a and a tire 12b supported thereon. A front suspension assembly 27 may be operably coupled to front ground-engaging members 10 and a rear suspension assembly 28 may be operably coupled to rear ground-engaging members 12.

Referring still to FIG. 1, utility vehicle 2 extends between a front end portion 14 and a rear end portion 16 along a longitudinal axis L and supports an operator area 18 therebetween. Operator area 18 includes seating 20 for at least the operator and also may support one or more passengers. In one embodiment, seating 20 includes side-by-side bucket-type seats while, in another embodiment, seating 20 includes a bench-type seat. A cargo area 22 is positioned rearward of operator area 18 and is supported by frame assembly 4 at rear end portion 16.

Figure 2:
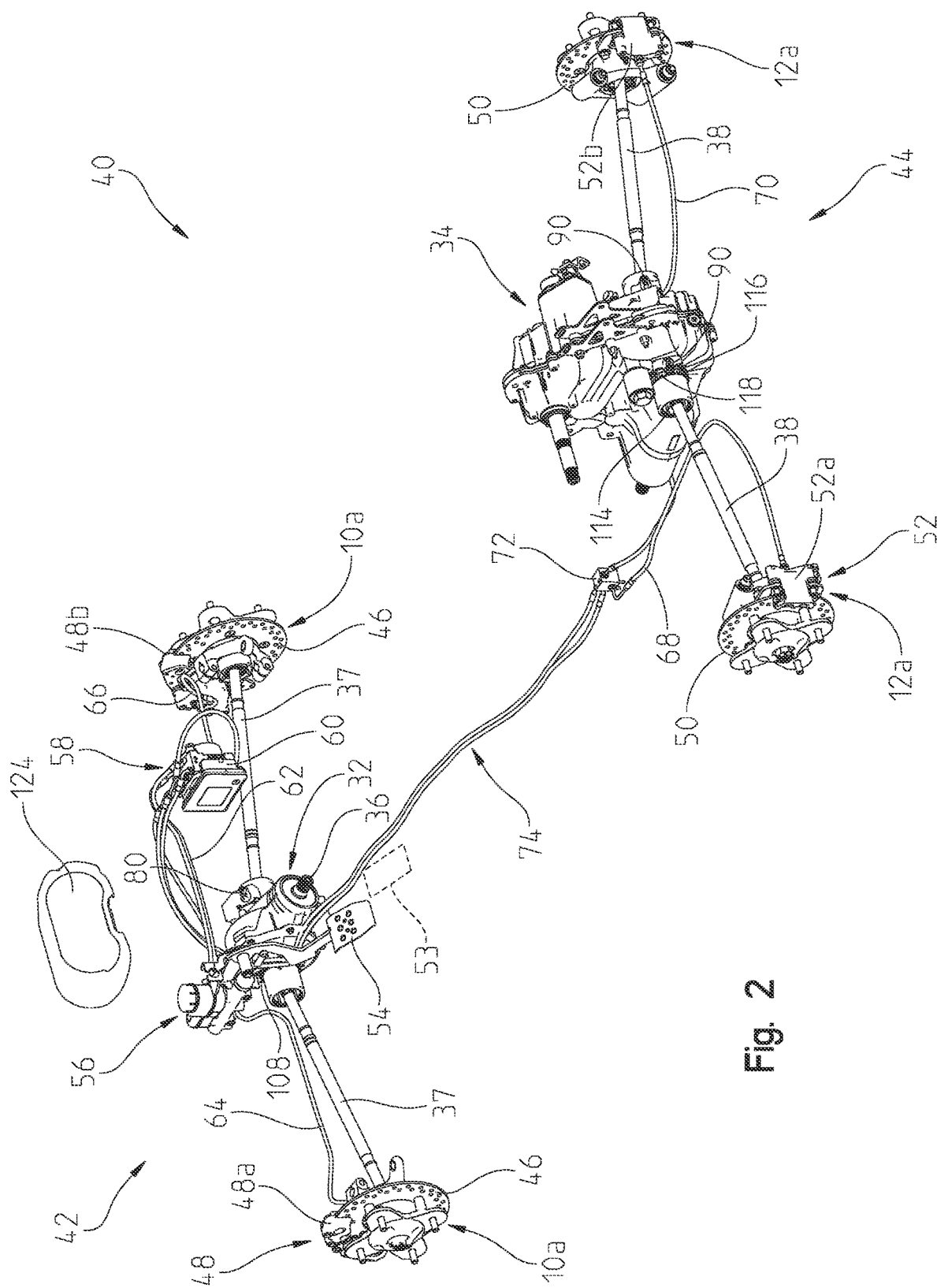
FIG. 2 is a left rear perspective view of a braking assembly of the utility vehicle of FIG. 1.

As shown in FIG. 1, operator area 18 includes operator controls 24, such as steering assembly 26, which may be operably coupled to one or more of ground-engaging members S. Additional operator controls 24 may include other inputs for controlling operation of vehicle 2, as disclosed further herein, such as an accelerator member or pedal 53 and a brake member or pedal 54 (FIG. 2). More particularly, various operator controls 24 may affect operation of a powertrain assembly 30 of vehicle 2. Powertrain assembly 30 may be supported by rear end portion 16 of vehicle 2 and includes an engine (not shown), a transmission (not shown) operably coupled to the engine, a front final drive member 32 (FIG. 2) operably coupled to front ground-engaging members 10 through front half shafts or axles 37, and a rear final drive member 34 (FIG. 2) operably coupled to rear ground-engaging members 12 through rear half shafts or axles 38. A drive shaft (not shown) may be operably coupled to front final drive member 32 at an input 36 (FIG. 2) for supplying motive power from the engine and/or transmission to front ground-engaging members 10. Rear final drive member 34 is operably coupled the engine and/or transmission to supply power therefrom to rear ground-engaging members 12.

Figure 3:
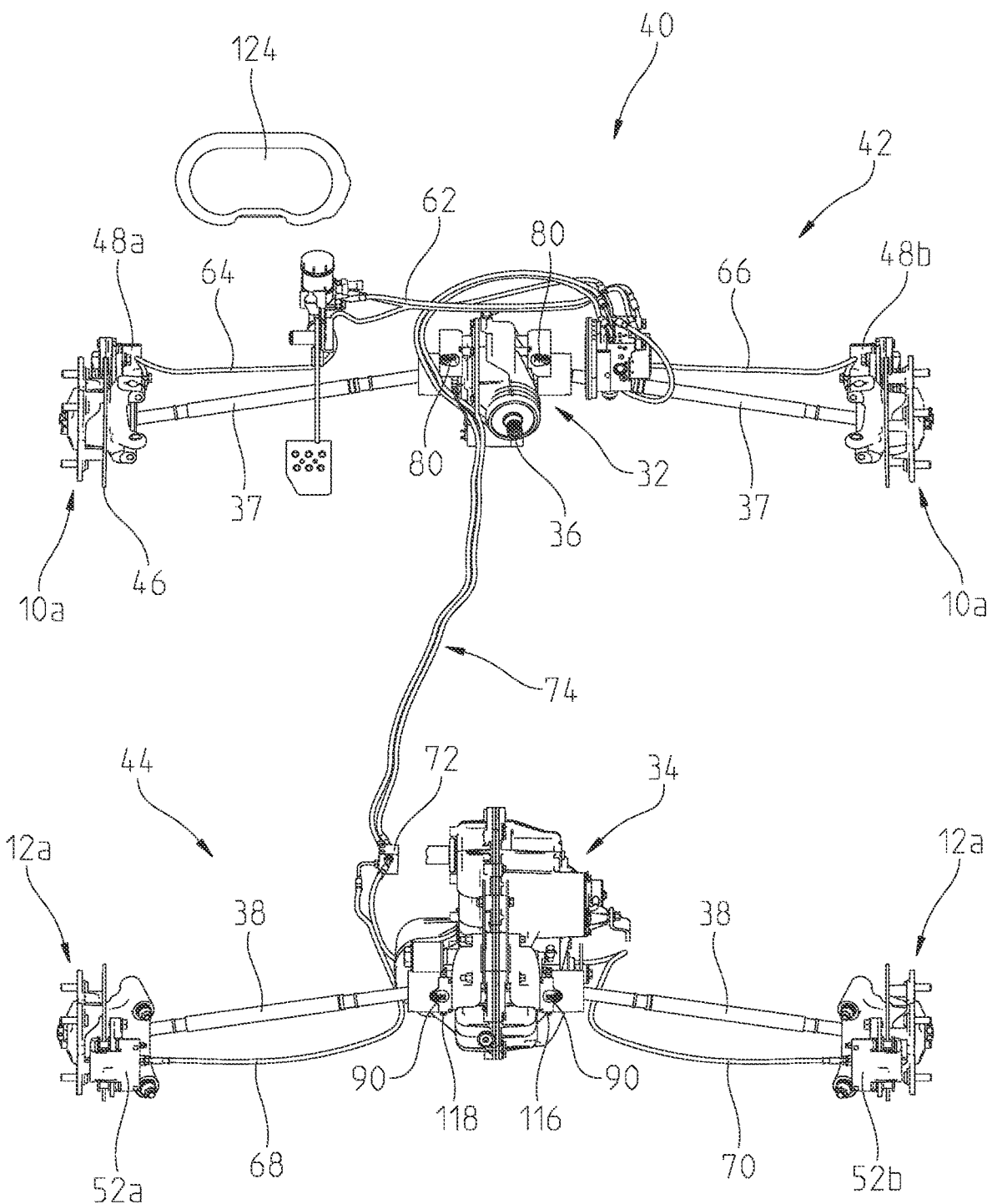
FIG. 3 is a rear perspective view of the braking assembly of FIG. 2.
Figure 4:
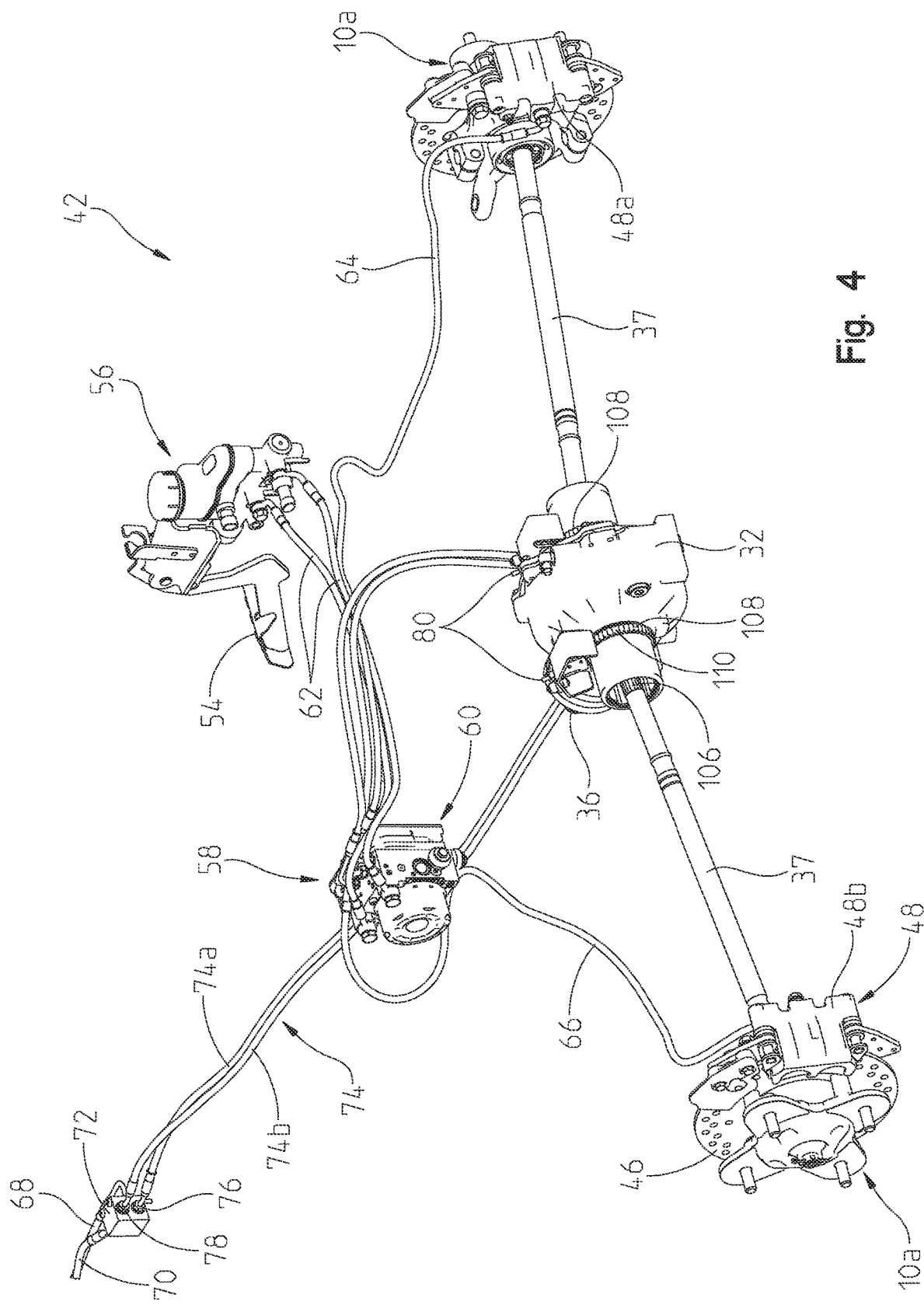
FIG. 4 is a right front perspective view of a front portion of the braking assembly of FIG. 2.

Referring to FIGS. 2-4, vehicle 2 includes a braking assembly 40, illustratively an anti-lock braking system ("ABS"), which includes a front end braking portion 42 positioned generally at front end portion 14 of vehicle 2 and is operably coupled to front ground-engaging members 10 and a rear end braking portion 44 positioned generally at rear end portion 16 of vehicle 2 and is operably coupled to rear ground-engaging members 12. Front end braking portion 42 includes front brake discs 46 and front brake calipers 48 operably coupled to front wheel assemblies 10a. Rear end braking portion 44 includes rear brake discs 50 and rear brake calipers 52 operably coupled to rear wheel assemblies 12a.

As shown in FIGS. 2-4, braking assembly 40 also includes brake member 54, illustratively a brake pedal, positioned within operator area 18 and is defined as one of the operator controls 24 (FIG. 1). Brake member 54 is operably coupled to a brake master cylinder 56 such that braking input from the operator of vehicle 2 is applied to brake member 54 and is transmitted to brake master cylinder 56.

Referring still to FIGS. 2-4, brake master cylinder 56 is operably coupled to a braking control system 58 which includes an anti-lock braking ("ABS") control module 60. More particularly, brake master cylinder 56 is fluidly coupled to ABS control module 60 through conduit(s) or line(s) 62. Illustratively, ABS control module 60 may be hydraulically actuated such that pressurized hydraulic fluid is configured to assist with the operation of braking assembly 40. With the use of ABS control module 60, braking assembly 40 is configured to operate in a normal run mode, in which an anti-lock braking feature ("ABS feature") is not engaged, and an anti-lock braking mode, in which the ABS feature is engaged.

ABS control module 60 also is fluidly coupled with brake calipers 48, 52. Illustratively, as shown in FIGS. 2-4, braking assembly 40 further includes a front left conduit or line 64, a front right conduit or line 66, a rear left conduit or line 68, and a rear right conduit or line 70 which are all fluidly coupled to ABS control module 60 through four channels, namely a front left channel 140, a front right channel 142, a rear left channel 144, and a rear right channel 146, respectively (FIG. 10), In this way, front left conduit 64 fluidly couples front left brake caliper 48a with ABS control module 60, front right conduit 66 fluidly couples front right brake caliper 48b with ABS control module 60, rear left conduit 68 fluidly couples rear left brake caliper 52a with ABS control module 60, and rear right conduit 70 fluidly couples rear right brake caliper 52b with ABS control module 60. ABS control module 60 also may include a front master cylinder output 148 and a rear master cylinder output 149, both of which are operably coupled to brake master cylinder 56 (FIG. 10), as disclosed herein.

Referring to FIGS. 2-5, with respect to rear end braking portion 44, conduits 68, 70 are fluidly coupled to ABS control module 60 through a junction member or box 72. Illustratively, at least one junction conduit or line 74 (illustratively first and second junction conduits 74a, 74b) extends from ABS control module 60 to junction member 72 such that ABS control module 60 is fluidly coupled with rear brake calipers 52a, 52b through junction conduit 74, junction member 72, and respective rear left and right conduits 68, 70.

Figure 5:
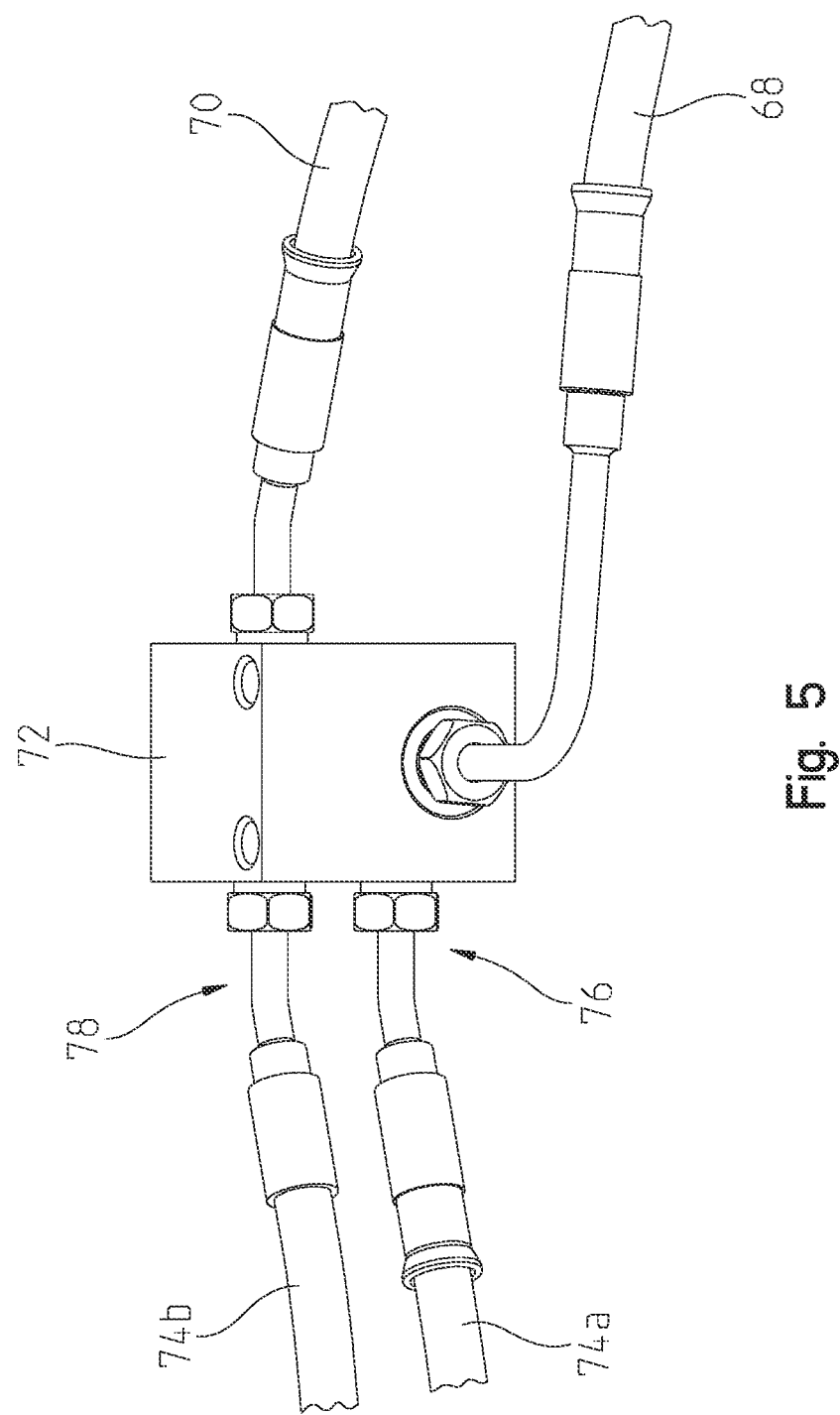
FIG. 5 is a junction member of the braking assembly of FIG. 2.

As shown best in FIG. 5, junction member 72 includes a first input 76 fluidly coupled to rear left conduit 68 through first junction conduit 74a and a second input 78 fluidly coupled to rear right conduit 70 through second junction conduit 74b. Junction member 72 facilitates serviceability of braking assembly 40 because if a repair or replacement is needed to rear end braking portion 44, then the repair or replacement may be made at the location of junction member 72, rather than having to fully disassemble all of braking assembly 40 for a repair to only a portion thereof. Additionally, junction member 72 is provided to allow for different braking pressures to be transmitted to rear brake calipers 52a, 52b, For example, a first braking pressure may be provided to rear brake caliper 52a through first junction conduit 74a and rear left conduit 68 while a greater or lesser braking pressure may be provided rear brake caliper 52b through second junction conduit 74b and rear right conduit 70.

Figure 6:
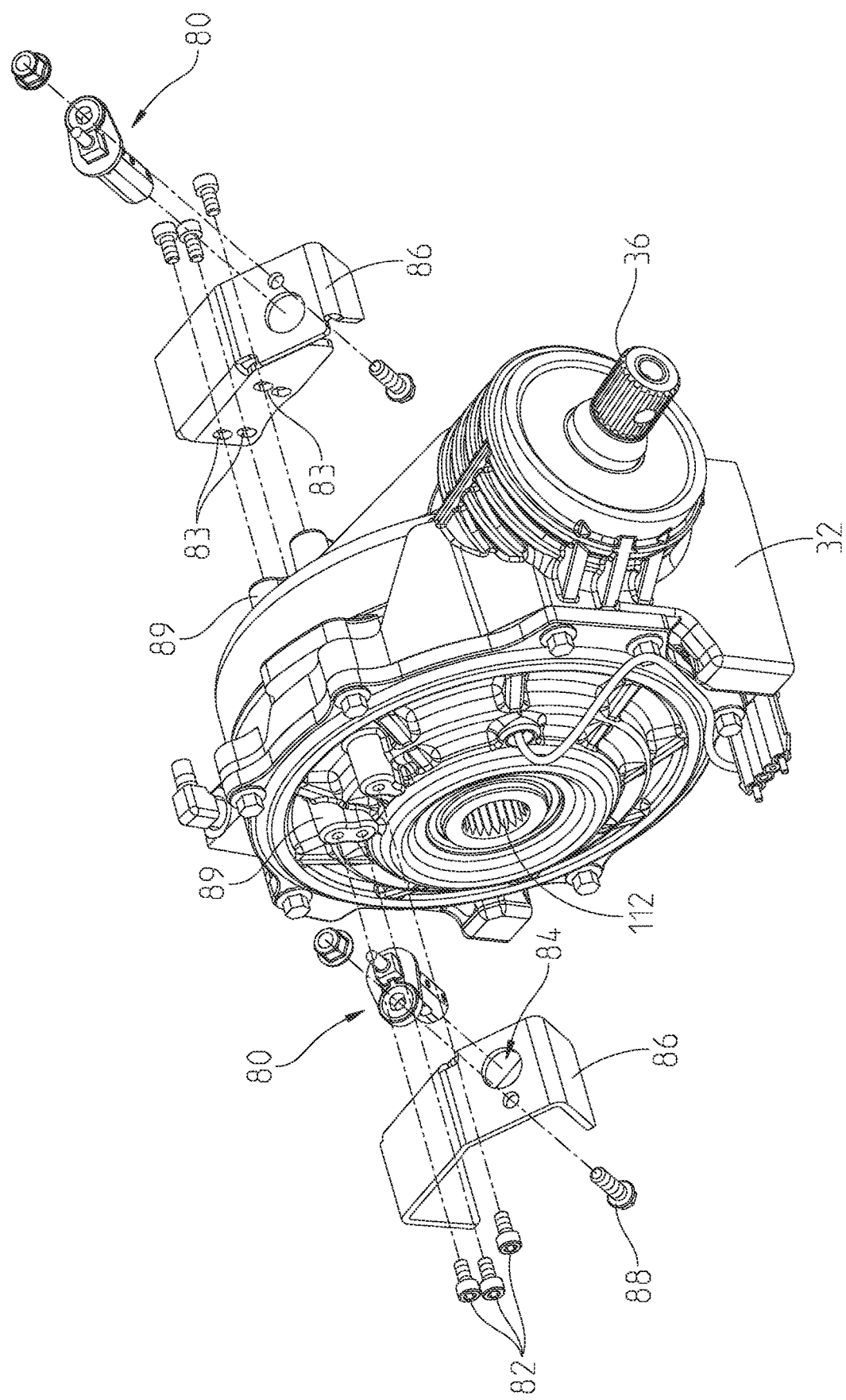
FIG. 6 is a left rear perspective view of a front drive member of the utility vehicle of FIG. 1.

Referring now to FIG. 6, braking control system 58 further includes front wheel speed sensors 80 configured to determine the rotational speed of front ground-engaging members (FIG. 1). Illustratively, each of front ground-engaging members 10 includes an individual wheel speed sensor 80. In one embodiment, wheel speed sensor 80 is coupled to a portion of front final drive member 32 through fasteners 82. As shown in FIG. 6, wheel speed sensor 80 is received through an aperture 84 of a mounting bracket 86. Mounting bracket 86 is coupled to a lateral portion of front final drive member 32 with fasteners 82 which are received within mounting bores 89 on the lateral portions of front final drive member 32. More particularly, fasteners 82 are received within openings 83 on bracket 86, which have an oval or oblong shape, thereby allowing the position of bracket 86 and sensor 80 to be adjustable relative to axle 37. Additional fasteners or couplers 88 are configured to removably couple sensor 80 on mounting bracket 86. It may be appreciated that sensor 80 is generally surrounded by mounting bracket 86 such that mounting bracket 86 conceals at least a portion of sensor 80 from debris and/or objects that may travel towards sensor 80 when vehicle 2 is moving, thereby minimizing damage to sensor 80 during operation of vehicle 2.

As shown best in FIG. 4, each of front half shafts 37 includes a drive coupling with a splined shaft 106. Splined shaft 106 couples with an output 112 (FIG. 6) of front final drive member 32. Additionally, a gear ring 108 is positioned on the outer surface of each of the drive couplings and is held in position relative to half shafts 37. As such, gear ring 108 is configured to rotate with its corresponding half shaft 37. Each of gear rings 108 includes a plurality of teeth 110 which cooperate with sensor 80 to determine the speed of each half shaft 37. Sensors 80 are positioned in proximity to teeth 110 but do not contact teeth 110; rather sensors 80 count teeth 110 as teeth 110 pass sensor 80 over a specific time period to calculate an angular velocity. Sensors 80 may be speed sensors such as Hall Effect speed sensors.

Figure 7:
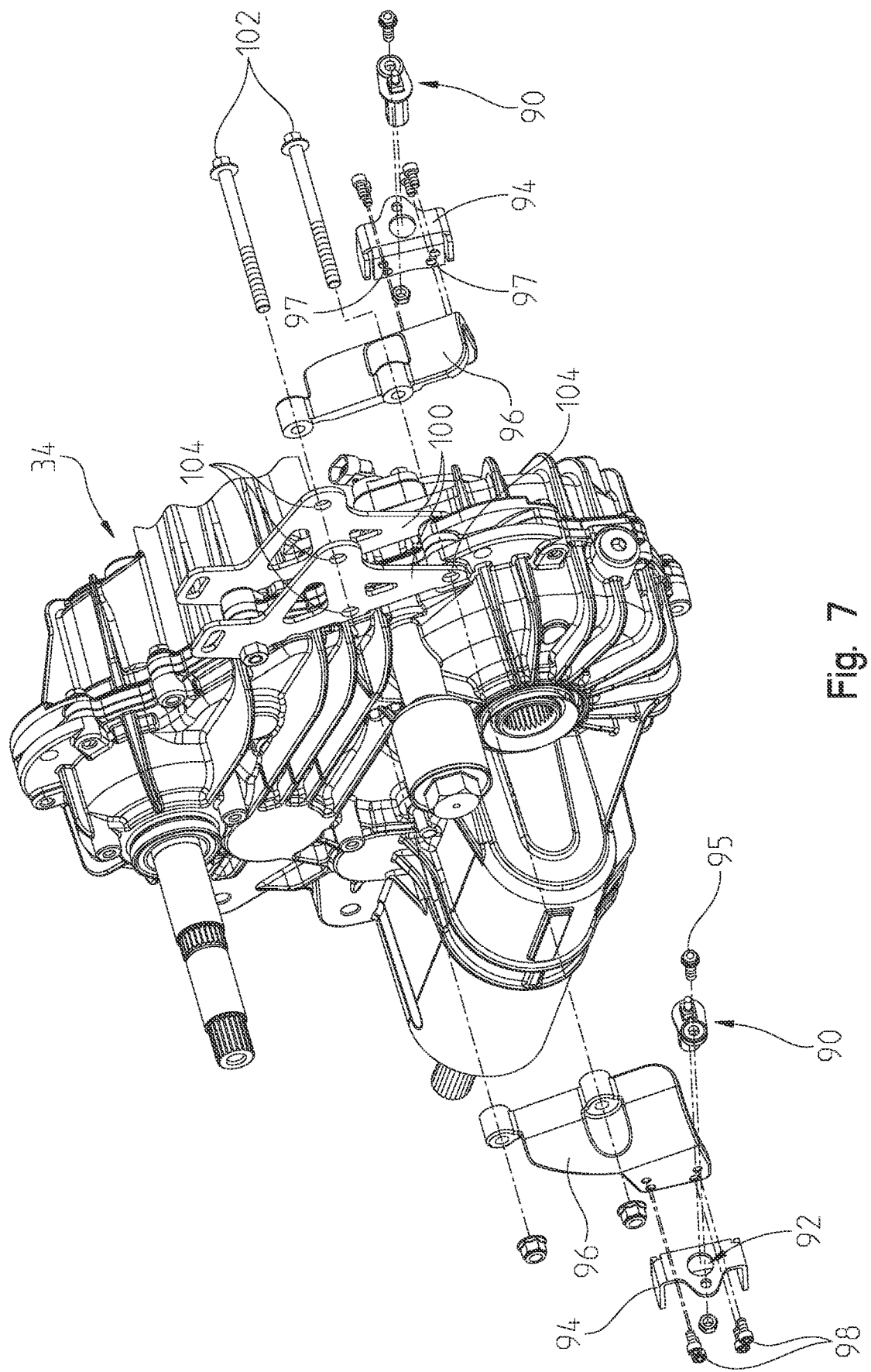
FIG. 7 is a left rear perspective view of a rear drive member of the utility vehicle of FIG. 1.

Referring to FIG. 7, braking control system 58 also includes rear wheel speed sensors 90 configured to determine the rotational speed of rear ground-engaging members 12 (FIG. 1). Illustratively, each of rear ground-engaging members 12 includes an individual wheel speed sensor 90. In one embodiment, wheel speed sensor 90 is coupled to a portion of rear final drive member 34. As shown in FIG. 7, wheel speed sensor 90 is received through an aperture 92 of a first mounting bracket 94 and is coupled to first mounting bracket 94 with fasteners 95. It may be appreciated that sensor 90 is generally surrounded by first mounting bracket 94 such that mounting bracket 94 conceals at least a portion of sensor 90 from debris and/or objects that may travel towards sensor 90 when vehicle 2 is moving, thereby minimizing damage to sensor 90 during operation of vehicle 2.

First mounting bracket 94 is coupled to a second mounting bracket 96 through fasteners 98. More particularly, fasteners 98 are received within openings 97 on first mounting bracket 94, which have an oval or oblong shape, thereby allowing the position of first mounting bracket 94 and sensor 90 to be adjustable relative to axle 38. And, second mounting bracket 96 is coupled to retainer members 100 on lateral portions of rear final drive member 34. Additional fasteners or couplers 102 are configured to removably couple second mounting bracket 96 to retainers 100 because fasteners 102 are received through apertures 104 of retainers 100. It may be appreciated that retainers 100 include a plurality of apertures 104 such that fasteners 102 can be received through any of apertures 104 to adjust the position of second mounting bracket 96 relative to axle 38, thereby also allowing for the position of sensor 90 to be adjustable relative to axle 38.

As shown best in FIGS. 2 and 3, each of rear half shafts 38 includes a drive coupling with a splined shaft 114 (FIG. 3). Splined shaft 114 couples with an output (not shown) of rear final drive member 34. Additionally, a gear ring 116 is positioned on the outer surface of each of the rear drive couplings and is held in position relative to its corresponding rear half shaft 38. As such, gear ring 116 is configured to rotate with its corresponding rear half shaft 38. Each of gear rings 116 includes a plurality of teeth 118 which cooperate with sensor 90 to determine the speed of each rear half shaft 38. Sensors 90 are positioned in proximity to teeth 118 but do not contact teeth 118; rather sensors 90 count teeth 118 as teeth 118 pass sensor 90 over a specific time period to calculate an angular velocity. Sensors 90 may be speed sensors such as Hall Effect speed sensors.

Figure 8:
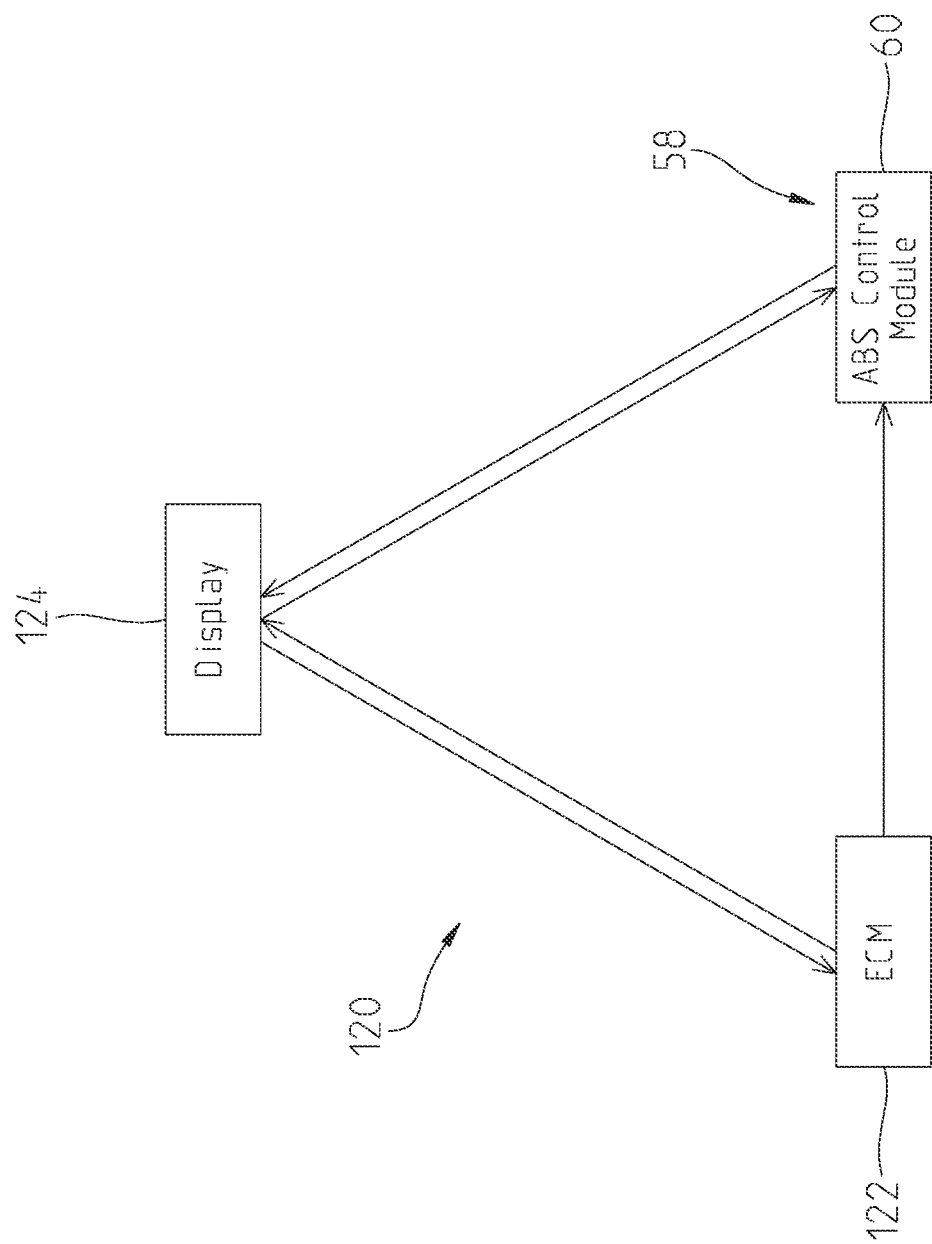
FIG. 8 is a schematic view of a portion of an electrical system of the utility vehicle of Fi g. 1.

Referring to FIG. 8, braking control system 58, including ABS control module 60, is electronically coupled or integrated with an overall electrical system 120 of vehicle 2. Electrical system 120 of vehicle 2 includes an engine control module ("ECM") 122 and at least one display or gauge 124. Display 124 is supported within operator area 18 (FIG. 1) and is configured to provide information about vehicle 2 to the operator. In one embodiment, ABS control module 60 may be operated through display 124 such the operator may provide a user input or user selection through display 124, which is transmitted to ABS control module 60, to turn on/engage or turn off/disengage the ABS feature of braking assembly 40. Illustrative display 124 may include toggle switches, buttons, a touchscreen, or any other type of surface or member configured to receive and transmit a selection made by the user. While ABS control module 60 is configured to engage/disengage the ABS feature through display 124 in the illustrative embodiment, it may be appreciated that vehicle 2 may include other inputs or means for engaging/disengaging the ABS feature.

Additionally, ABS control module 60 is configured to transmit information about braking assembly 40 to display 124 to provide such information to the operator. For example, ABS control module 60 may be configured to transmit a fault signal to display 124 to indicate to the operator that a fault has occurred within a portion of braking assembly 40, such as a fault of the ABS feature of braking assembly 40. The fault indicator provided on display 124 may be a light, an alphanumeric code or message, or any other indication configured to alert the user of the fault.

Additionally, display 124 is in electronic communication with ECM 122 to provide information to the operator about the engine (not shown) or other components of powertrain assembly 30. Illustratively, ECM 122 transmits various signals to display 124 to provide information such as engine speed, engine temperature, oil pressure, the driving gear or mode, and/or any other information about powertrain assembly 30. Additionally, as shown in FIG. 8, display 124 is configured to provide inputs and other information to ECM 122, For example, if illustrative vehicle 2 is configured with an adjustable speed limiting device and feature, the user may input speed limits to display 124 which are transmitted to ECM 122 from display 124 to control the speed of vehicle 2, as disclosed further herein.

Figure 9:
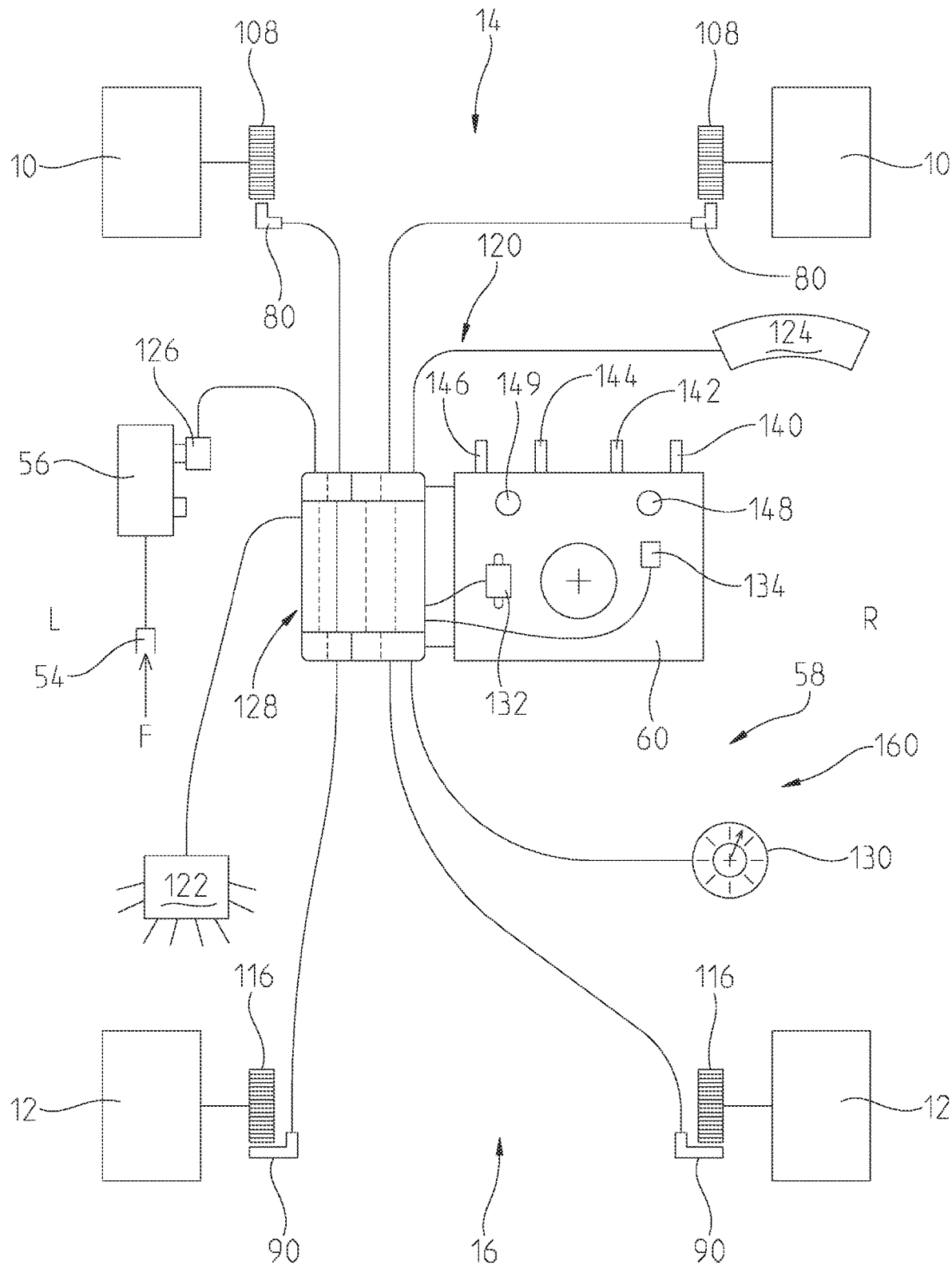
FIG. 9 is a schematic view of an electronic braking circuit of the electrical system of FIG. 8.

Referring to FIG. 9, a schematic view of braking control system 58 and at least a portion of electrical system 120 is disclosed with respect to operation of braking assembly 40. As denoted, front end portion 14 and rear end portion 16 are shown and the left side of vehicle 2 is denoted with "L" and the right side of vehicle 2 is denoted with "R." As shown in FIG. 9, when the operator depresses brake member 54 with a force F, force F is transmitted to brake master cylinder 56, which may be a tandem master cylinder in one embodiment. Brake master cylinder 56 is configured to transmit braking input information to a brake pressure switch 126. Brake pressure switch 126 is then configured to transmit a signal indicative of braking pressure information to a multi-pin connector 128. Multi-pin connector 128 also may be configured to transmit and/or receive information to and from ECM 122, a steering angle sensor 130 of electrical system 120, display 124, and ABS control module 60. More particularly, ABS control module 60 may include a multi-axis (3 sensor 132 and a pressure sensor 134, one or both of which may be internal or external sensors and are configured for communication with multi-pin connector 128. Additionally, multi-pin connector 128 is electrically coupled with front wheel speed sensors 80 and rear wheel speed sensors 90.

Referring still to FIG. 9, in operation, multi-pin connector 128 is configured to receive a user input or user selection from display 124 to indicate if the user has turned on/engaged or turned off/disengaged the ABS feature of braking assembly 40 (e.g., via CAN messages) such that braking assembly 40 is to operate in the anti-lock braking mode or the normal run mode, respectively. Multi-pin connector 128 also may receive signals or other information from ECM 122, steering angle sensor 130, speed sensors 80, 90, multi-axis G sensor 132, and pressure sensor 134 to determine information about the operating conditions of vehicle 2. If the user has engaged the ABS feature of braking assembly 40, for example through display 124, such that braking assembly 40 is to operate in the anti-lock braking mode, then multi-pin connector 128 is configured to electrically communicate with ABS control module 60 to engage the ABS feature of braking assembly 40 when the user provides an input to brake member 54.

However, if the user has turned off/disengaged the ABS feature of braking assembly 40, for example through a selection on display 124, such that braking assembly 40 is to operate in the normal run mode, then multi-pin connector 128 is configured to determine if the ABS feature should be automatically turned on/engaged based on the vehicle operating conditions. For example, the ABS feature of braking assembly 40 may be automatically turned on/engaged based on a predetermined condition, such a vehicle operating condition, an environmental condition, or any other condition which may affect the driving conditions of vehicle 2. In one embodiment, the predetermined condition may be a predetermined vehicle speed, the steering angle, conditions of the engine, terrain or environmental conditions, or any other condition or factor related to operating conditions of vehicle 2. The predetermined vehicle speed that initiates automatic engagement of the ABS feature of braking assembly 40 may be approximately 30 kph. In this way, even if the user has previously selected to disengage the ABS feature of braking assembly 40, the ABS feature will be automatically engaged, without any user input, via electrical system 120 (e.g., the communication between multi-pin connector 128 and ABS control module 60) when vehicle 2 is operating at the predetermined operating condition, such as a vehicle speed of at least approximately 30 kph.

It may be appreciated that the ABS feature of braking assembly 40 does not automatically turn off or disengage, but rather, is only disengaged through an operator or user input to display 124. As such, the ABS feature may automatically engage based on vehicle operating conditions but does not automatically disengage and, instead, must be manually disengaged by the operator through display 124. However, the ABS feature can only be disengaged when the vehicle speed is less than the predetermined vehicle speed (e.g., 30 kph). As such, even if the user selects, via display 124, to disengage the ABS feature, ABS control module 60 will not disengage the ABS feature if the vehicle speed is greater than the predetermined vehicle speed. In one embodiment, display 124 may temporarily hide or conceal the user option to disengage the ABS feature when the vehicle speed is greater than the predetermined speed value (e.g., 30 kph).

Also, even if a fault occurs in braking assembly 40, the ABS feature will not disengage and, instead, a fault indicator will be provided to the operator through display 124. Therefore, the operator will become aware of the fault within braking assembly 40 and may determine, based on the fault indication, if adjustments should be made to the operating conditions of vehicle 2. Yet, the ABS feature will remain engaged throughout the fault condition. Furthermore, the fault indicator will not initiate a slow-down of the vehicle speed such that vehicle 2 may continue to operate at the speed input by the operator even when a fault is indicated.

Figure 10A:
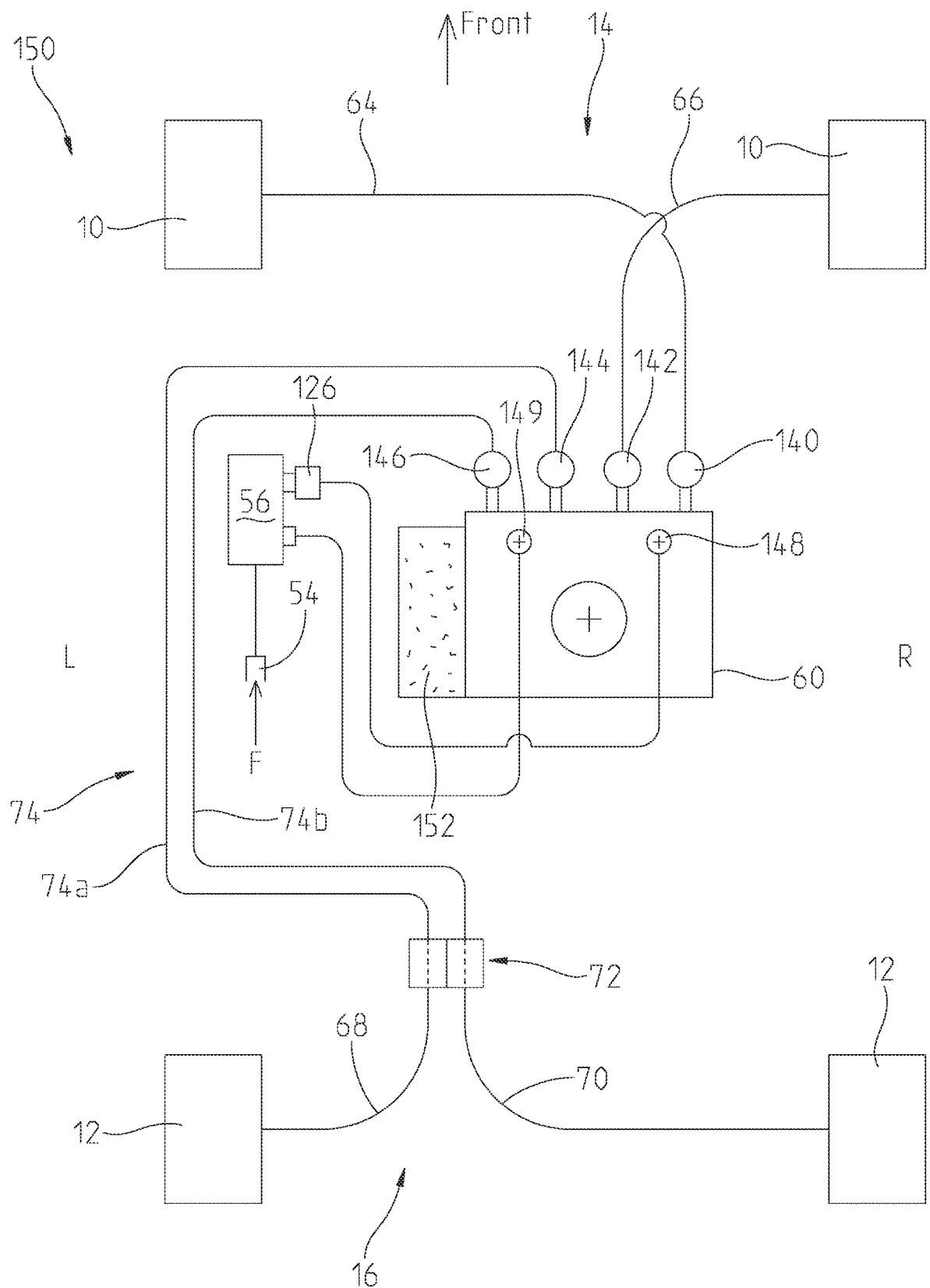
FIG. 10A is a schematic view of a hydraulic circuit of the braking assembly of FIG. 2.

Referring now to FIG. 10A, a schematic view of a hydraulic system 150 of vehicle 2 is disclosed with respect to operation of braking assembly 40. Hydraulic system 150 includes a hydraulic reservoir 152 fluidly coupled to ABS control module 60 and also fluidly coupled to junction member 72, and ground-engaging members 10, 12 through any of conduits 64, 66, 68, 74, In operation, as force F is applied to brake member 54 by the operator, brake master cylinder 56 transmits force F to ABS control module 60 through at least brake pressure switch 126. More particularly, brake master cylinder 56 is in communication with front and rear master cylinder outputs 148, 149 which allows hydraulic fluid from hydraulic fluid reservoir 152 to flow to front and rear ground-engaging members 10, 12 through channels 140, 142, 144, 146.

Illustratively, and still referring to FIG. 10A, as force F is applied to brake member 54, brake master cylinder 56 provides an input to front master cylinder output 148 through brake pressure switch 126 to initiate a flow of hydraulic fluid through front left channel 140 and front left conduit 64 to front left ground-engaging member 10. Additionally, the input provided to front master cylinder output 148 through brake pressure switch 126 also initiates a flow of hydraulic fluid through front right channel 142 and front right conduit 66 to front right ground-engaging member 10. With respect to rear ground-engaging members 12, as force F is applied to brake member 54, brake master cylinder 56 provides an input to rear master cylinder output 149 to initiate a flow of hydraulic fluid through rear left channel 144, first junction conduit 74a, junction member 72, and rear left conduit 68 to rear left ground-engaging member 12. Additionally, the input provided to rear master cylinder output 149 from brake master cylinder 56 also initiates a flow of hydraulic fluid through rear right channel 146, second junction conduit 74b, junction member 72, and rear right conduit 70 to rear right ground-engaging member 12. In this way, a single actuation of braking assembly 40 when the operator depresses brake member 54 allows for braking of all ground-engaging members 10, 12 through the four channels 140, 142, 144, 146 of ABS control module 60. It may be appreciated that, if the ABS feature is engaged, the flow of hydraulic fluid to any of brake calipers 48, 52 may be modulated, temporarily stopped, and/or otherwise adjusted by ABS control module 60 to minimize skidding and maintain steering control of vehicle 2.

Figure 10B:
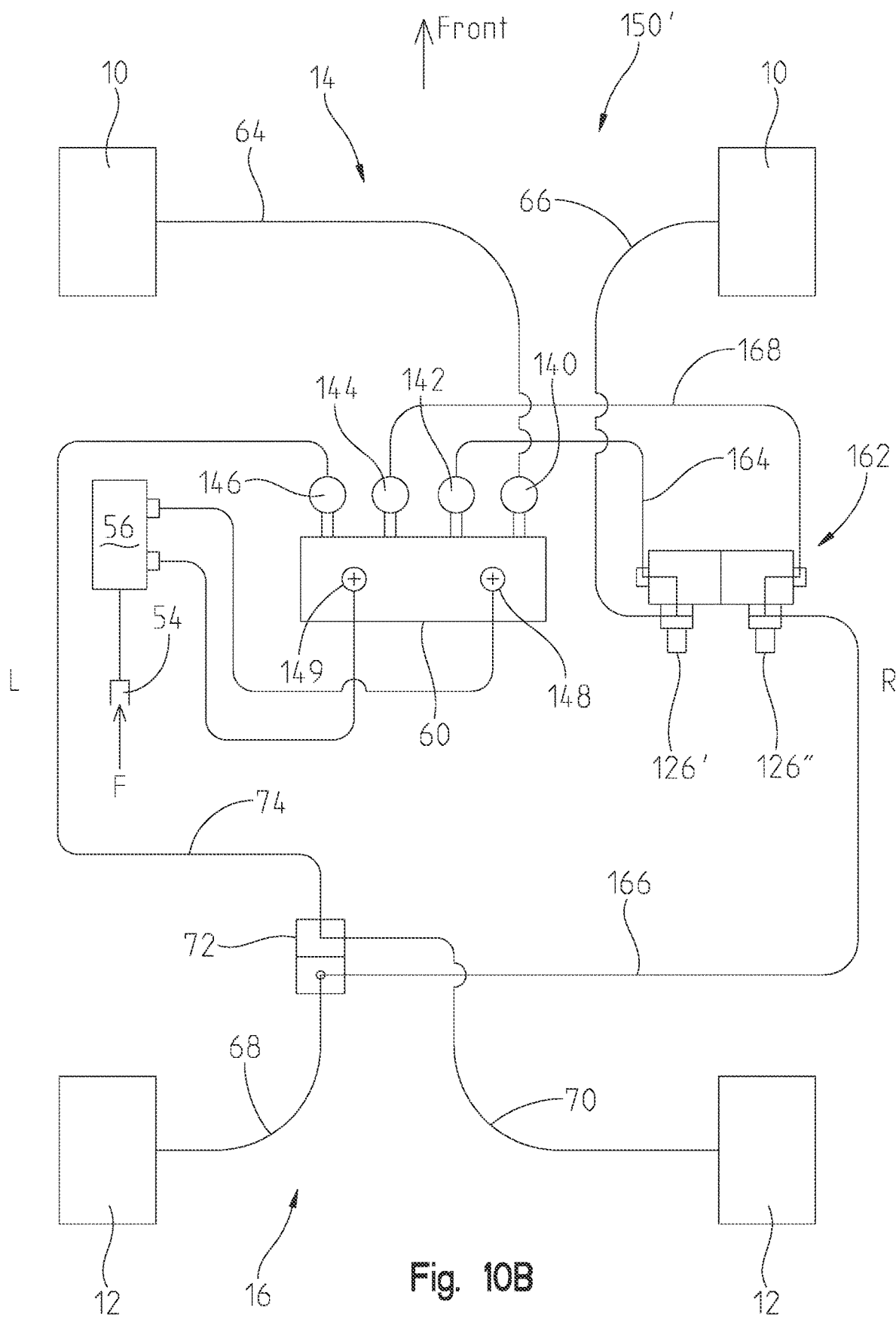
FIG. 10B is a schematic view of an alternative hydraulic circuit of the braking assembly of FIG. 2.

Referring now to FIG. 10B, a schematic view of an alternative hydraulic system 150' of vehicle 2 is disclosed with respect to operation of braking assembly 40, with like components of hydraulic system 150 (FIG. 10A) shown with like reference numbers in operation, as force F is applied to brake member 54 by the operator, brake master cylinder 56 transmits force F to ABS control module 60. More particularly, as force F is applied to brake member 54, brake master cylinder 56 provides an input to front master cylinder output 148 to initiate a flow of hydraulic fluid through front left channel 140 and front left conduit 64 to front left ground-engaging member 10. Additionally, the input provided to front master cylinder output 148 also initiates a flow of hydraulic fluid through front right channel 142 and a first front right conduit 164 fluidly coupled to a junction block or junction member 162. First front right conduit 164 is fluidly coupled to a first switching member 126' of junction member 162 and transmits hydraulic fluid or other braking input or signal to front right ground-engaging member through second front right conduit 66.

With respect to rear ground-engaging members 12, as force F is applied to brake member 54, brake master cylinder 56 provides an input to rear master cylinder output 149 to initiate a flow of hydraulic fluid through rear right channel 146, junction conduit 74, junction member 72, and rear right conduit 70 to rear right ground-engaging member 12. Additionally, the input provided to rear master cylinder output 149 from brake master cylinder 56 also initiates a flow of hydraulic fluid through rear left channel 144 which is fluidly coupled to junction member 162 through a first junction conduit 168. At junction member 162, hydraulic fluid or other braking input or signal is transmitted through a second switching member 126" and flows through second junction conduit 166, which is fluidly coupled to junction member 72. At junction member 72, hydraulic fluid or other braking input flows through rear left conduit 68 to rear right ground-engaging member 12. In this way, a single actuation of braking assembly 40 when the operator depresses brake member 54 allows for braking of all ground-engaging members 10, 12 through the four channels 140, 142, 144, 146 of ABS control module 60. It may be appreciated that, if the ABS feature is engaged, the flow of hydraulic fluid to any of brake calipers 48, 52 may be modulated, temporarily stopped, and/or otherwise adjusted by ABS control module 60 to minimize skidding and maintain steering control of vehicle 2.

ABS Operating Modes

Figure 11:
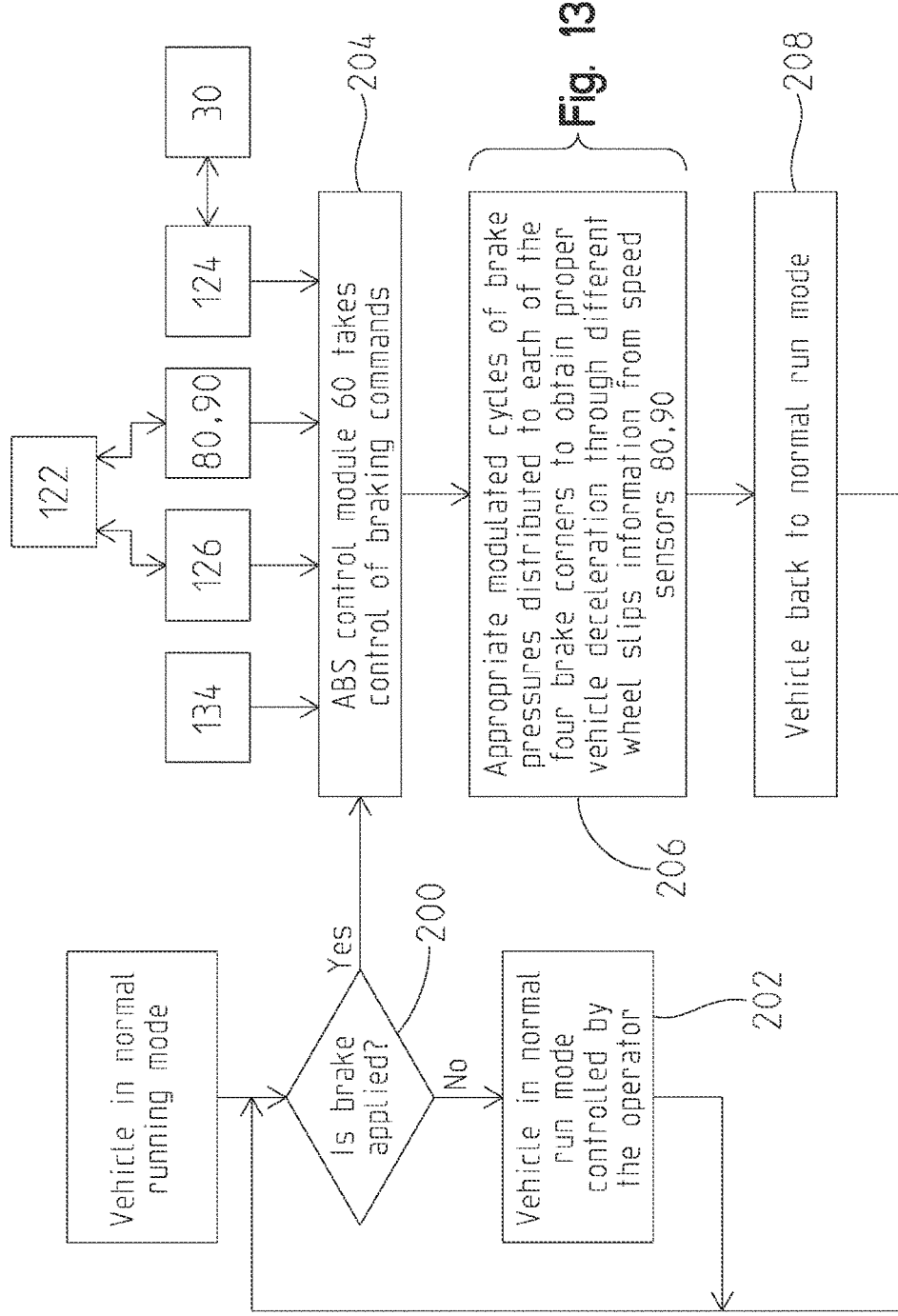
FIG. 11 is a control diagram of the braking assembly of FIG. 2 operating in a first or ABS On operating mode.
Figure 12:
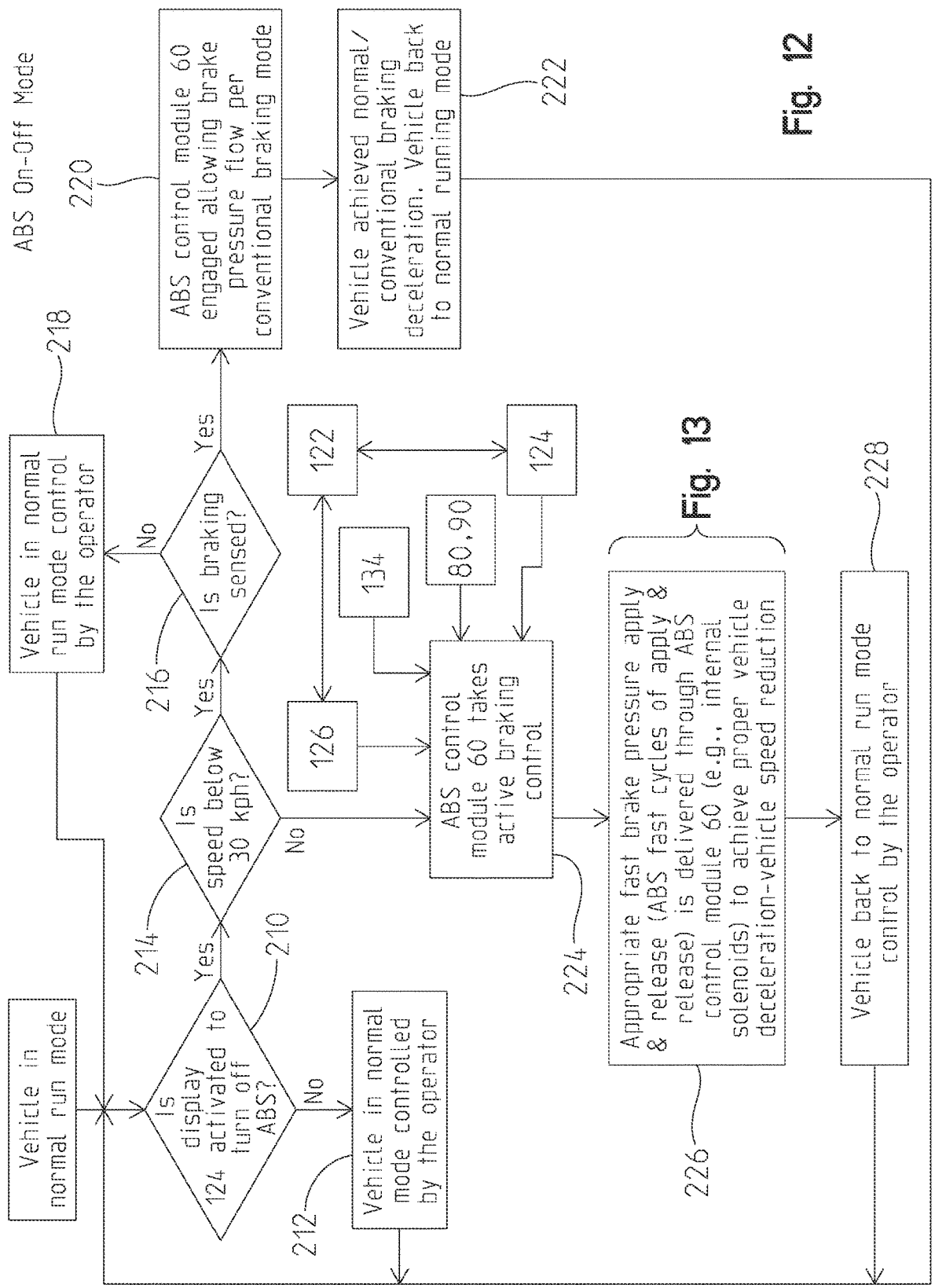
FIG. 12 is a control diagram of the braking assembly of FIG. 2 operating in a second or ABS On-Off operating mode.
Figure 13:
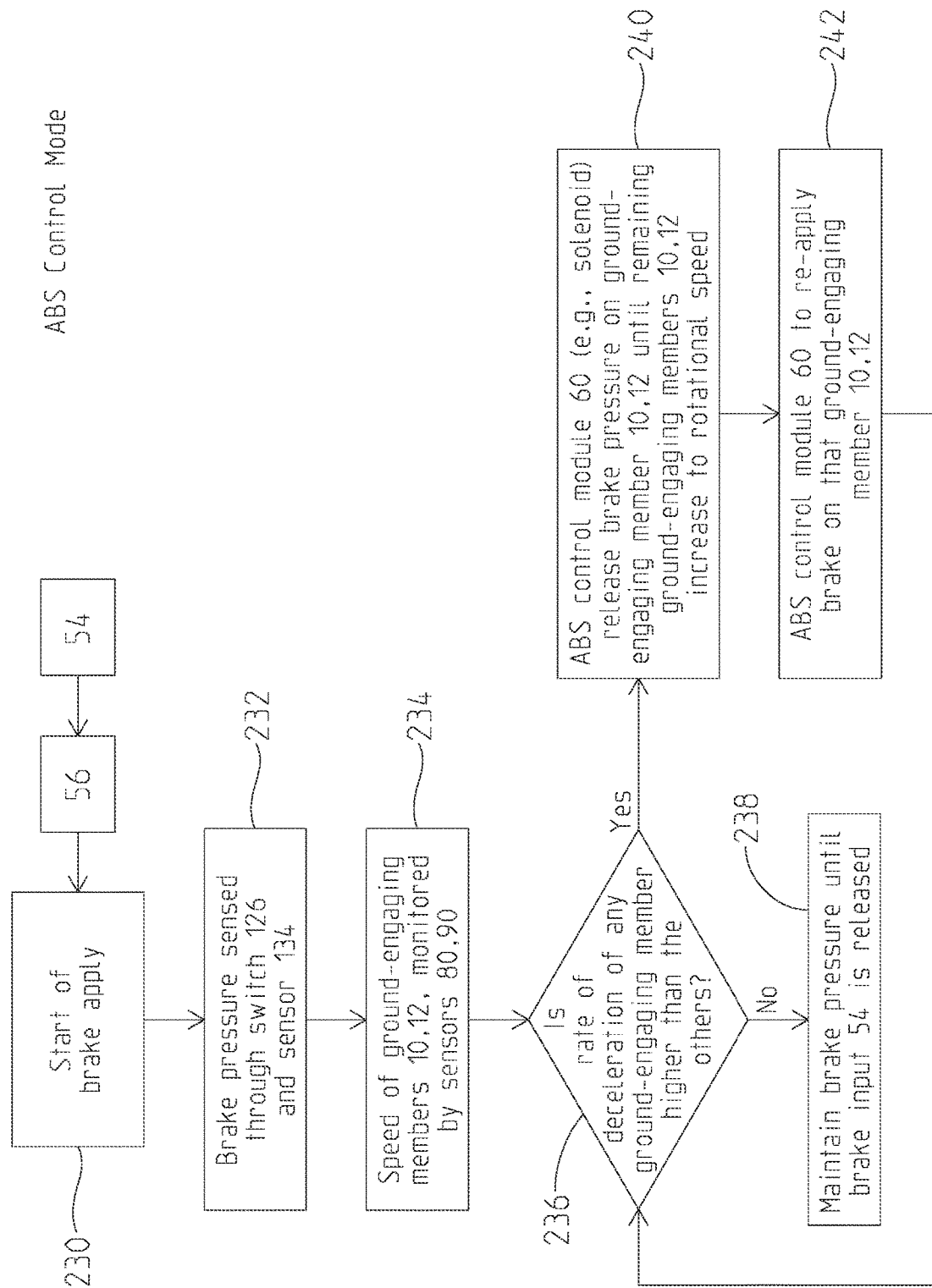
FIG. 13 is a control diagram of the braking assembly of FIG. 2 operating in a third or ABS Control operating mode.

With respect to the operation of braking assembly 40, FIGS. 11-13 disclose various operating modes which may be used for the ABS feature. As disclosed herein, braking assembly may be configured to automatically turn off the ABS feature when the vehicle speed is below a prescribed or predetermined speed (e.g., 30 kph) and is configured to automatically turn on the ABS feature when the vehicle speed is above the prescribed speed. Alternatively, braking assembly 40 may be configured to allow the user to manually turn on and off the ABS feature.

FIG. 11 discloses a first operating mode of braking assembly 40 in which the ABS feature always engages when braking is applied by the user (i.e, the "ABS On Mode"). More particularly, if vehicle 2 first begins to operate in the normal run mode (i.e., the ABS feature is not initially engaged), electrical system 120 may determine if brake member 54 (FIG. 2) has been actuated such that braking has been applied in a Step 200. If no braking has been applied, then vehicle 2 continues to operate in the normal run mode, as controlled by the operator, in Step 202. However, if braking is applied in Step 200, for example through brake member 54, then ABS control module 60 takes control of braking assembly 40 in Step 204 and, because the ABS feature is always engaged in this ABS On Mode, the ABS feature is utilized in the braking process. In Step 204, ABS control module 60 receives inputs from at least pressure sensor 134, brake pressure switch 126, wheel speed sensors 80, 90, ECM 122, and display 124. Display 124 also may receive inputs from a portion of powertrain assembly 30, such as the engine and/or transmission (not shown), regarding information of the operating conditions thereof. With this information, ABS control module 60 modulates cycles of brake pressure, using hydraulic fluid from hydraulic fluid reservoir 152 (FIG. 10A), to distribute pressurized braking fluid to at least some of ground-engaging members 10, 12 in Step 206. During Step 206, ABS control module modulates the pressured braking fluid based on information received by wheel speed sensors 90 to obtain appropriate vehicle deceleration through different wheel slips. Once vehicle 2 properly decelerates and braking has been terminated, vehicle 2 returns to the normal run mode in Step 208 until another braking input is applied, at which time, the ABS feature will automatically be utilized again by ABS control module 60 in the ABS On Mode.

However, and now referring to FIG. 12, as disclosed herein the ABS feature of braking assembly 40 may be selectively engaged in a second operating mode (i.e., the "ABS On-Off Mode"). More particularly, in the ABS On-Off Mode, the ABS feature may not always be engaged upon a braking input, but instead, the operator may selectively engage or disengage the ABS feature through display 124. As such, FIG. 12 discloses a Step 210 which allows electrical system 120 to determine if a user input or user selection has been applied to display 124 to engage or disengage the ABS feature such that vehicle 2. If the vehicle 2 is operating in the normal run mode and no input has been provided to display 124, then vehicle 2 continues in the normal run mode and is controlled by the operator, as shown in Step 212.

However, if display 124 has disengaged the ABS feature of braking assembly 40 in Step 210, then electrical system 120, including ABS control module 60, determines if the vehicle speed is below a predetermined value e.g., 30 kph) in Step 214 using information from wheel speed sensors 80, 90 (FIG. 9). If the vehicle speed is less than the predetermined speed threshold (e.g., 30 kph), then ABS control module 60 determines if braking is sensed by an input applied to brake member 54 (FIG. 2) in Step 216, If braking has not been sensed, then vehicle 2 continues to operate in the normal run mode and is controlled by the operator, as shown in Step 218. And, even if braking has been sensed, as long as the vehicle speed is below the predetermined operating condition (e.g., vehicle speed of 30 kph), then ABS control module 60 allows braking to occur without the ABS feature, as shown in Step 220. In Step 222, vehicle 2 will achieve braking deceleration without the ABS feature engaged and will return to the normal run mode. In this way, the ABS feature of braking assembly 40 will not automatically engage if the user has disengaged the ABS feature and the vehicle speed is below the predetermined threshold value. As such, braking may occur but without the ABS feature engaged when braking assembly 40 operates in the ABS On-Off Mode.

Yet, as shown in Step 224 of FIG. 12, if the vehicle speed is above the predetermined threshold value (e.g., 30 kph), then ABS control module 60 is automatically engaged to take control of operation of braking assembly 40 and engage the ABS feature, despite the user's previous selection through display 124 to disengage the ABS feature. In this way, ABS control module 60 will automatically change from the normal run mode to the anti-lock braking mode in response to the vehicle speed, regardless of the user's previous selection with respect to the ABS feature. At Step 224, ABS control module 60 receives inputs, signals, or other information from a plurality of other components, such as brake pressure switch 126, pressure sensor 134, wheel speed sensors 80, 90, ECM 122 and display 124. Using this information, ABS control module 60 then modulates cycles of brake pressure, using hydraulic fluid from hydraulic fluid reservoir 152 (FIG. 1.0A), to distribute pressurized braking fluid to each of ground-engaging members 10, 12 in Step 226. During Step 226, ABS control module 60 (e.g., internal solenoids) modulates the pressured braking fluid based on information received by wheel speed sensors 80, 90 to Obtain appropriate vehicle deceleration through different wheel slips. Once vehicle 2 properly decelerates, vehicle 2 returns to the normal run mode in Step 228 until another braking input is applied.

Referring to FIG. 13, a third operating mode of braking assembly 40 is shown as the ABS Control Module Mode. More particularly, as the operator provides an input to brake member 54 (FIG. 2), the brake input is transmitted to brake master cylinder 56 to start the braking process, as shown in Step 230. The braking pressure may be determined by brake pressure switch 126 and pressure sensor 134 (FIG. 10A) in Step 232 and the speed of ground-engaging members 10, 12 is determined by respective wheel speed sensors 80, 90, as shown in Step 234.

With this information from Steps 232 and 234, electrical system 120, including ABS control module 60, may determine if the rate of deceleration of any of ground-engaging members 10, 12 is greater than the deceleration rate of the other ground-engaging members 10, 12, as shown in Step 236. If the deceleration rate of one of ground-engaging members 10, 12 is not greater than that of the others, then brake pressure is maintained until brake member 54 is released by the operator, as shown in Step 238.

However, if the deceleration rate of one of ground-engaging members 10, 12 is greater than that of the others, then, in Step 240, ABS control module 60 (e.g., internal solenoid) may release the brake pressure on the one ground-engaging member 10, 12 which has a greater deceleration rate than the others. In Step 240, ABS control module 60 is configured to release the brake pressure on the one ground-engaging member 10, 12 until the remaining ground-engaging members 10, 12 increase in deceleration rate to equal that of the one ground-engaging member 10, 12. In this way, ABS control module 60 utilizes the ABS feature to minimize wheel slipping on the ground surface and to maintain steering control of vehicle 2.

Once all ground-engaging members 10, 12 have approximately equal deceleration rates, then ABS control module 60 re-applies braking pressure to the one ground-engaging member 10, 12 with the initially-greater deceleration rate such that braking pressure is now applied to all of ground-engaging members 10, 12, as shown in Step 242.

It may be appreciated that braking assembly 40 may be pre-set to operate in only one of the three operating modes of FIGS. 11-13, as set by a manufacturer or dealer of vehicle 2, or may be configured to operate in any of the operating modes of FIGS. 11-13 based on an input from the user. It may be appreciated that, in any of the three operating modes of FIGS. 11-13, ABS control module 60 may be automatically engaged to turn on the ABS feature in response to an error of the vehicle speed transmitted by ECM 122 and/or sensors 80, 90. Additionally, depending on the operating mode, the user has the ability to turn on and off the ABS feature during operation of vehicle 2 and, as such, can make adjustments to the performance and handling of vehicle 2 while operating vehicle 2. However, as disclosed herein, electrical system 120 may ignore a user's request to disengage or turn off the ABS feature, depending on the predetermined vehicle condition (e.g., a vehicle speed of at least 30 kph).

Furthermore, it may be appreciated that both the ABS On Mode and the ABS On-Off Mode may utilize the features of the ABS Control Mode by also modulating the braking pressure, as disclosed best in FIG. 13, in Steps 206 and 226, respectively. As such, when the ABS feature is engaged, ABS control module 60 is configured to monitor the deceleration rate of each of ground-engaging members 10, 12 and may regulate or modulate the flow of hydraulic flow to any brake caliper 48, 52 of a ground-engaging member 10, 12 with a greater deceleration rate than the others.

ASLD Operating Modes

Figure 14A:
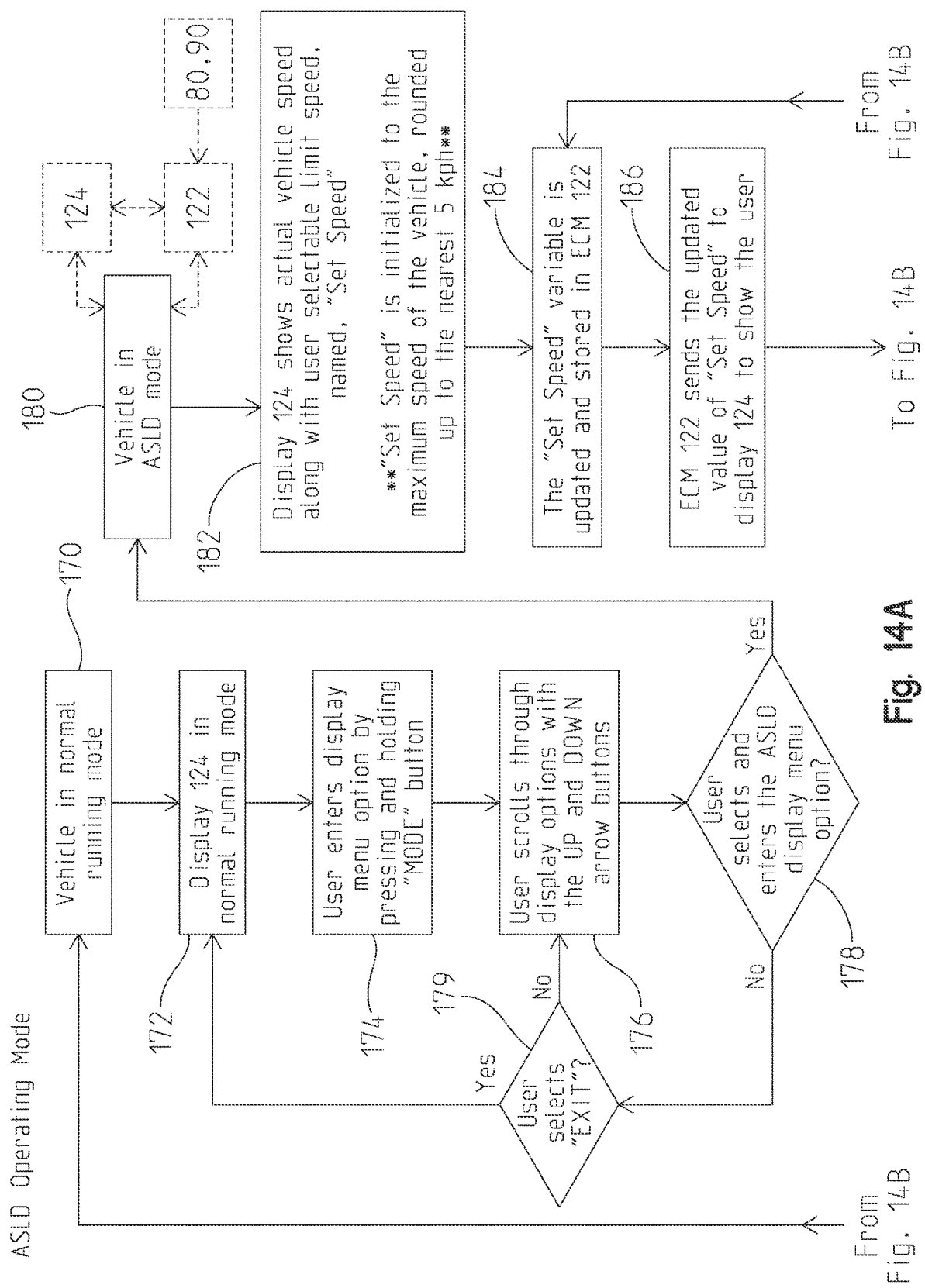
FIGS. 14A and 14B are respective portions of a control diagram of an adjustable speed limiting feature of the vehicle of FIG. 1.
Figure 14B:
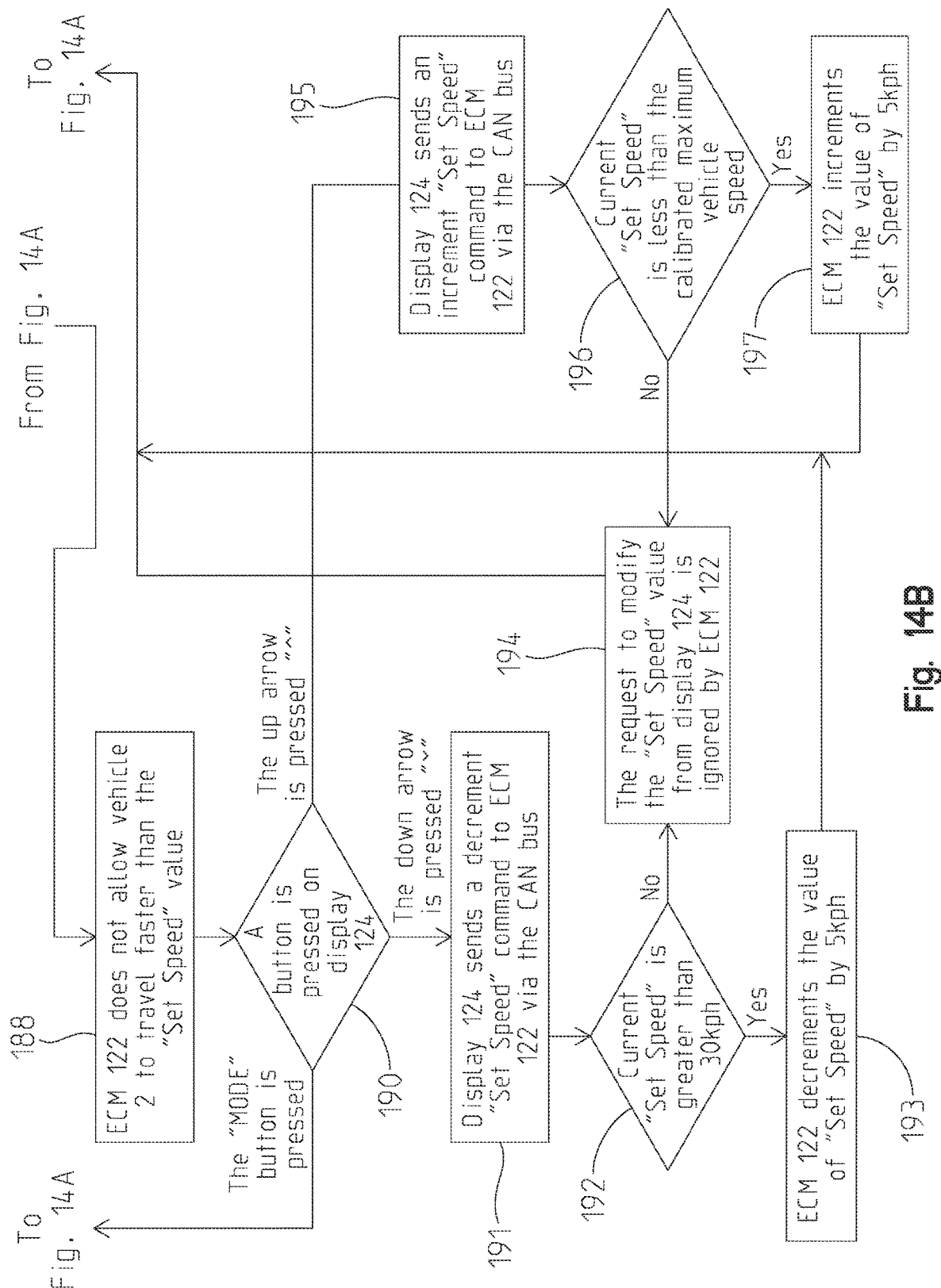
Figure 15:
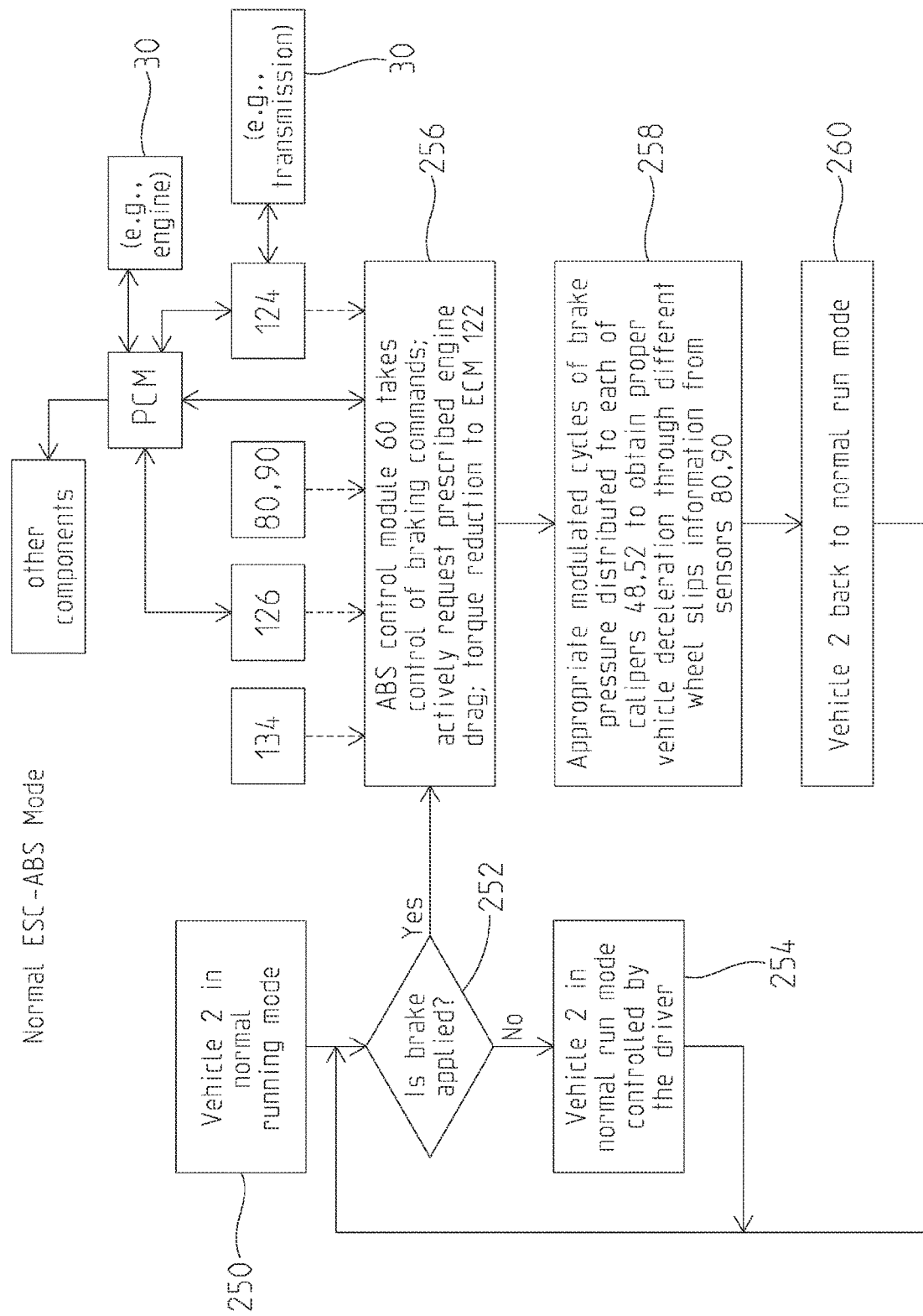
FIG. 15 is a control diagram of an electronic stability control ("ESC") assembly of the vehicle of FIG. 1 operating in a first or Normal ESC and ABS Mode.

Referring to FIG. 14, vehicle 2 may be configured with an adjustable speed limiting device or feature ("ASLD") in which the user may selectively define speed limits when vehicle 2 is operating. For example, the user may engage or turn on the adjustable speed limiting feature through display 124, which will allow vehicle 2 to operate at speed limits between a predetermined lower speed limit (e.g., 30 kph) and a predetermined maximum speed limit. When utilizing the adjustable speed limiting feature, the user may adjust the speed limit in predetermined speed intervals or increments (e.g., 5 kph) for each step change.

As shown in FIG. 14, in Step 170, vehicle 2 operates in the normal run mode. While vehicle 2 operates in the normal run mode, display 124 is in a corresponding normal run mode, as shown in Step 172. In Step 174, the operator or another user enters Display Menu Options by pressing or otherwise providing an input to a "MODE" input of display 124. In Step 176, the user scrolls through the Display Menu Options with inputs, such as "UP" and "DOWN" arrow buttons. In Step 178, the user may select and enter the ASLD Display Menu Options. If the user does not select the ASLD Display Menu Options, then the user may select an "EXIT" input in Step 179. If the user selects the "EXIT" option in Step 179, then display 124 returns to the normal run mode, as shown in Step 172. However, if the user does not select the "EXIT" option in Step 179, then the user is able to continue to scroll through the Display Menu Options, as shown in Step 176.

If in Step 178, the user selects and enters the ASLD Display Menu Options, then vehicle 2 begins to operate in accordance with the ASLD feature in Step 180. When utilizing the ASLD feature in Step 180, electrical system 120, such as ABS control module 60, may communicate with display 124, ECM 122, and wheel speed sensors 80, 90 to obtain any necessary information for operating vehicle 2 according to the ASLD feature. In Step 182, display 124 provides or shows the actual vehicle speed as well as a user selectable speed limit. The user selectable speed may be labeled on display as "Set Speed", "Speed Lim", or any other type of alphanumeric code, label, or information that alerts the user to the location of the user selectable speed limit option on display 124. The user selectable speed limit may be initialized to the maximum speed of vehicle 2, rounded to the nearest 5 kph, in one embodiment.

In Step 184, the user selectable speed limit variable may be updated to any value selected by the user and stored in ECM 122. In Step 186, ECM 122 provides the updated user selected speed limit to display 124 such that the user is able to quickly determine the speed limit. In Step 188, ECM 122 will not allow vehicle 2 to travel faster than the user selected speed limit.

In Step 190, an input (e.g., a button) may be actuated (e.g., pressed) on display 124 when the user is operating vehicle 2 in accordance with the ASLD feature. For example, if the "MODE" input is actuated in Step 190, then vehicle 2 continues to operate in accordance with the ASLD feature.

However, if the "DOWN" input (e.g., arrow button) is actuated in Step 190, then display 124 sends a decrement command to ECM 122 via the CAN bus network for a possible reduction to the user selected speed limit, as shown in Step 191. In Step 192, it is determined if the current user selected speed limit is greater than a predetermined speed value (e.g., 30 kph). If Step 192 determines that the user selected speed limit is greater than the predetermined speed value, then ECM 122 decreases the value of the user selected speed limit by a predetermined incremental amount (e.g., 5 kph), as shown in Step 193. Following Step 193, ECM 122 is updated with the decreased user selected speed limit, as shown in Step 184.

Yet, if Step 192 determines that the user selected speed limit is not greater than the predetermined speed value, then, as shown in Step 194, the request to modify the user selected speed limit through display 124 is ignored by ECM 122 and the original user selected speed limit continues to be stored in ECM 122, as shown in Step 184.

However, if in Step 190, if the "UP" input (e.g., arrow button) is actuated, then, as shown in Step 195, display 124 sends an increment command to ECM 122 via the CAN bus network for a possible increase to the user selected speed limit. In Step 196, it is determined if the current user selected speed is less than a calibrated maximum vehicle speed for vehicle 2. If Step 195 determines that the user selected speed limit is less than the calibrated maximum vehicle speed, then ECM 122 increase the value of the user selected speed limit by a predetermined incremental amount (e.g., 5 kph), as shown in Step 197. Following Step 197, ECM 122 is updated with the increased user selected speed limit, as shown in Step 184.

Yet, if Step 196 determines that the user selected speed limit is greater than the calibrated maximum vehicle speed, then the request to modify the user selected speed limit through display 124 is ignored by ECM 122, as shown in Step 194.

Additionally, in one embodiment, if vehicle 2 is operating in various modes (e.g., a farm or ranch mode), the user may first shift to low gear before engaging the adjustable speed limiting feature through display 124. Once the adjustable speed limiting feature is engaged, the predetermined speed increments for each step change may be approximately 1 mph. For example, in an embodiment of vehicle 2 having the farm or ranch operating mode, the predetermined lower speed limit may be approximately 5 mph and the predetermined maximum speed limit may be approximately 12 mph with predetermined speed increments of approximately 1 mph for each step change.

ESC Operating Modes

Additionally, as shown in at least FIG. 9, with the addition of steering angle sensor 130, ECM 122, ABS control module 60, and/or any other component of electrical system 120 may include an electronic stability control ("ESC") assembly or program 160. ESC assembly 160 may include a yaw rate sensor positioned within a portion of steering assembly 26 (FIG. 1), for example in a portion of an electric power steering module, as well as steering angle sensor 130. ESC assembly 160 may be configured within ECM 122, any other component of electrical system 120, and/or may be a separate module electrically coupled to electrical system 120 and/or ECM 122. In one embodiment, ESC assembly 160 may be selectively engaged by the user through display 124 and/or any other component of vehicle 2; however, in other embodiments. ESC assembly 160 may be automatically engaged by ECM 122 or other components of electrical system 120 based on various operating conditions, such as vehicle conditions, environmental conditions, terrain conditions, etc. Also, it may be appreciated the ESC assembly 160 may always be engaged upon starting vehicle 2 such that ESC assembly 160 is not selectively engaged or disengaged.

More particularly, and as shown in FIGS. 15-20, ESC assembly 160 is configured to operate in various operating modes. With respect to FIG. 15, ESC assembly 160 is configured to operate in a first or ESC and ABS Normal Operating Mode. In the ESC and ABS Normal Operating Mode, when vehicle 2 is operating in the normal run mode, as shown in Step 250, electrical system 120 may determine if brake member 54 (FIG. 2) has been actuated such that braking has been applied in a Step 252. If no braking has been applied, then vehicle 2 continues to operate in the normal run mode, as controlled by the operator, in Step 254.

However, if braking is applied in Step 252, for example through brake member 54, then ABS control module 60 takes control of braking assembly 40 in Step 256. In Step 256, ABS control module 60 may actively request prescribed drag torque reduction to ECM 122. Additionally, in Step 256, ABS control module 60 communicates with at least pressure sensor 134, brake pressure switch 126, wheel speed sensors 80, 90, ECM 122, and display 124. Display 124 also may communicate with a portion of powertrain assembly 30, such as the engine and/or transmission (not shown), regarding information of the operating conditions thereof, and ECM 122 may communicate with other components of vehicle 2.

With this information, ABS control module 60 modulates cycles of brake pressure, using hydraulic fluid from hydraulic fluid reservoir 152 (FIG. 10A), to distribute pressurized braking fluid to each brake caliper 48, 52 in Step 258, During Step 258, using information from speed sensors 80, 90, ABS control module 60 modulates the pressured braking fluid based on information received by wheel speed sensors 80, 90 to obtain appropriate vehicle deceleration through different wheel slips. Once vehicle 2 properly decelerates and braking has been terminated, vehicle 2 returns to the normal run mode in Step 260 until another braking input is applied.

Figure 16:
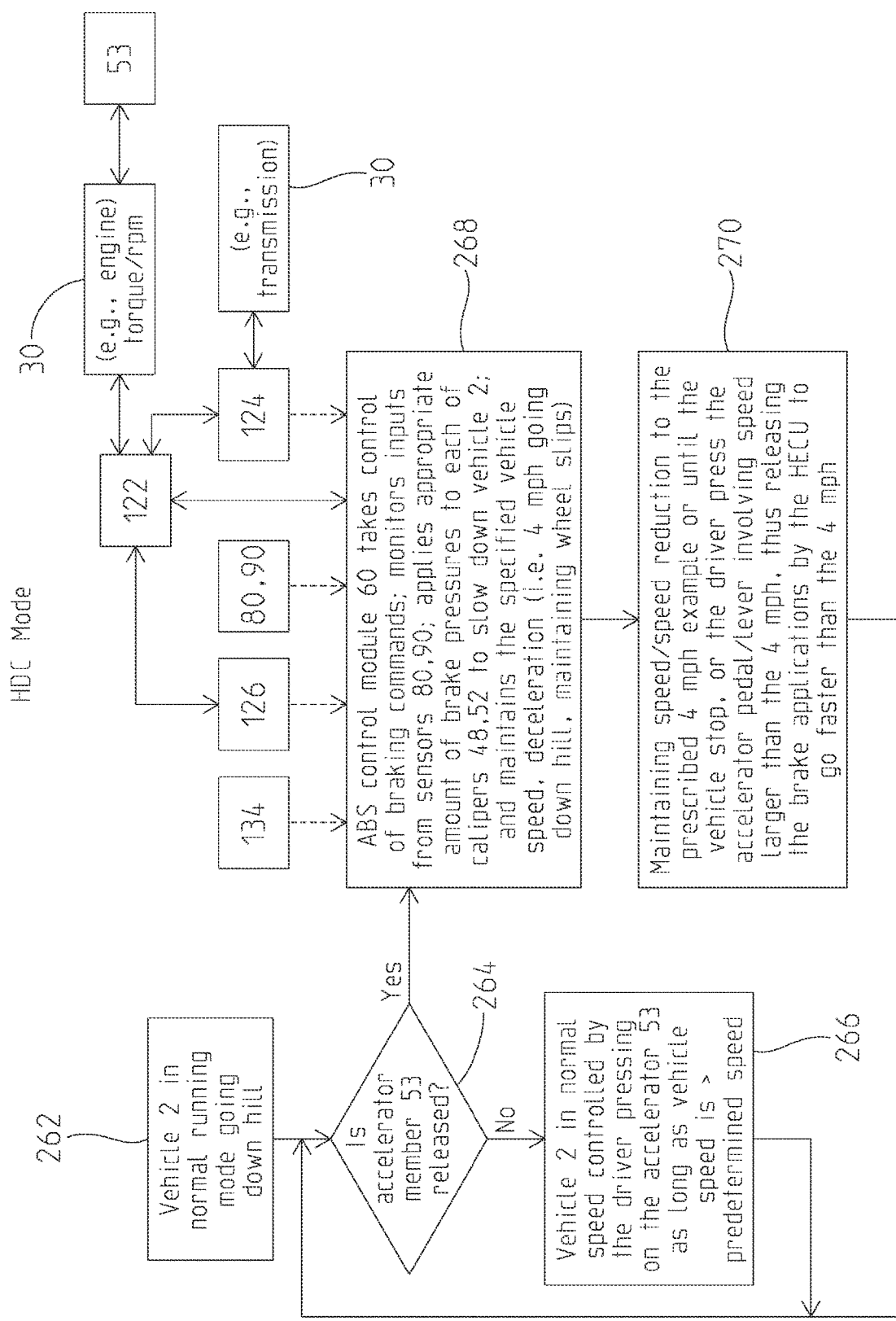
FIG. 16 is a control diagram of the ESC assembly operating in a second or Hill Descent Control ("HDC") Mode.

With respect to FIG. 16, ESC assembly 160 is configured to operate in a second or Hill Descent Control ("HDC") Operating Mode. In the HDC Operating Mode, when vehicle 2 is operating in the normal run mode, as shown in Step 262, electrical system 120 may determine if accelerator member 53 (FIG. 2) has been released such that at least no acceleration is being applied in a Step 264. If accelerator member 53 has not been released, then vehicle 2 continues to operate in the normal run mode, as controlled by the operator pressing or otherwise providing an input to accelerator member 53, in Step 266. In Step 266, vehicle 2 continues to operate in the normal run mode while the operator provides an input to accelerator member 53 as long as the vehicle speed is less than a predetermined speed value (e.g., 4 mph).

However, if accelerator member 52 has been released in Step 264, then ABS control module 60 takes control of braking assembly 40 in Step 268. In Step 268, ABS control module 60 may monitor inputs from speed sensors 80, 90 to apply an appropriate amount of brake pressure to each caliper 48, 52 to decrease vehicle speed while maintaining a predetermined or specified vehicle speed deceleration rate and proper wheel slips. In one embodiment, the predetermined or specified vehicle speed deceleration rate may be approximately 4 mph when vehicle 2 is traveling down hill. Additionally, in Step 268, ABS control module 60 communicates with at least pressure sensor 134, brake pressure switch 126, ECM 122, and display 124. Display 124 also may communicate with a portion of powertrain assembly 30, such as the engine and/or transmission (not shown), regarding information of the operating conditions thereof, and ECM 122 may communicate with other components of vehicle 2, In one embodiment, in Step 268, ECM 122 communicates with the engine to determine torque and rpm information and also may communicate with accelerator member 53 for electronic throttle control (FIG. 2).

In Step 270, ESC assembly 160 is configured to maintain speed and/or a speed reduction to the prescribed speed vehicle speed (e.g., 4 mph), until vehicle 2 stops, or until the operator provides an input to accelerator member 53 (i.e., invokes a speed larger than the prescribed vehicle speed (e.g., 4 mph), thereby releasing the braking input).

Figure 17:
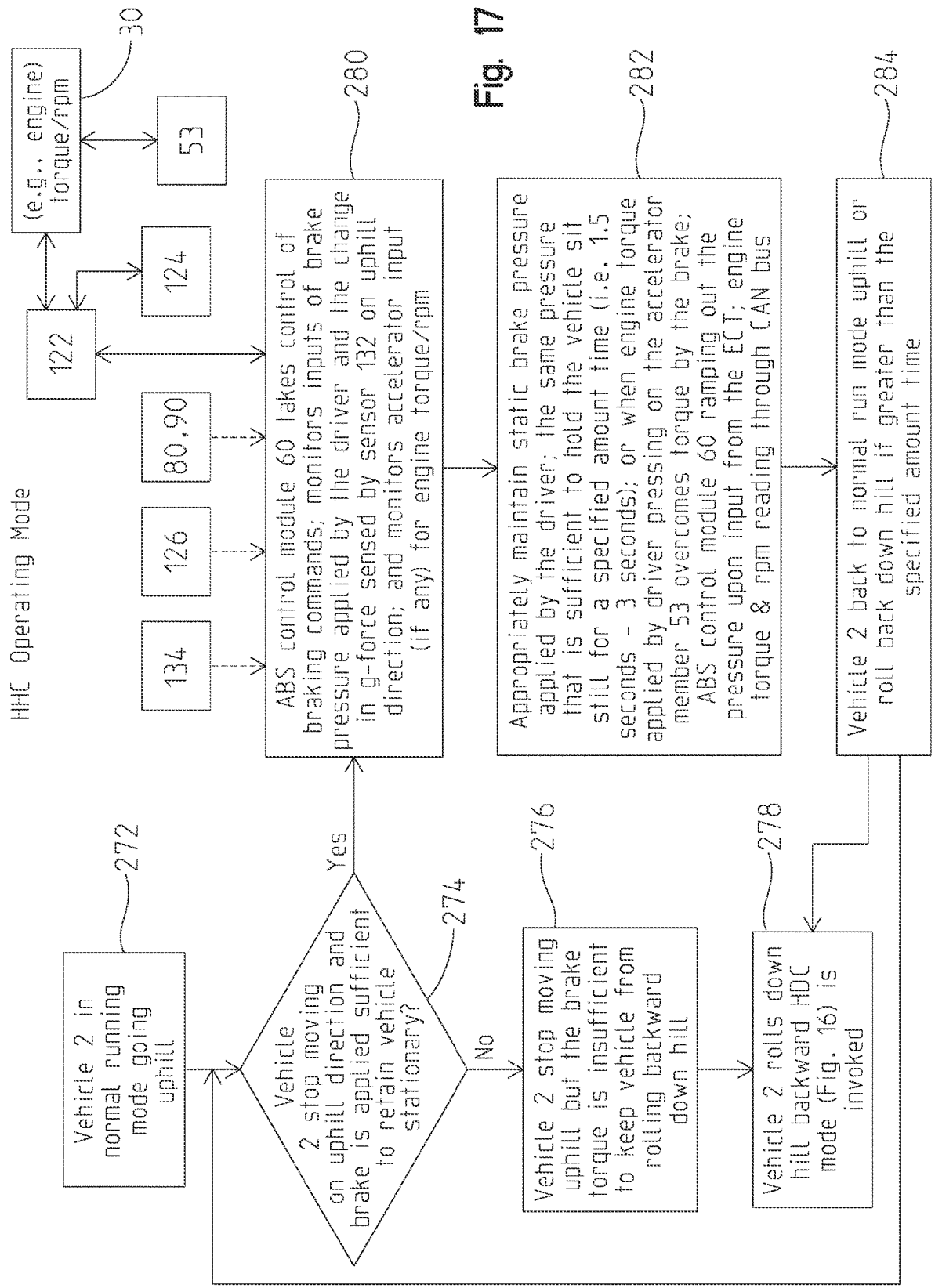
FIG. 17 is a control diagram of the ESC assembly operating in a third or Hill Assist/Hill Hold Control ("MC") Mode.

With respect to FIG. 17, ESC assembly 160 is configured to operate in a third or Hill Assist/Hill Hold Control ("HHC") Operating Mode. In the HHC Operating Mode, when vehicle 2 is operating in the normal run mode, as shown in Step 272, electrical system 120 may determine if vehicle 2 has stopped moving while in an uphill direction and if brake member 54 (FIG. 2) has been sufficiently applied to retain vehicle 2 in a stationary position while on uphill terrain or in an uphill direction, as shown in Step. 274 if it is determined that vehicle 2 has stopped moved in the uphill direction but the brake torque is insufficient to keep vehicle 2 from rolling backwards in a downhill direction, as shown in Step 276, then the HDC Operating Mode is invoked, as shown in Step 278, to prevent vehicle 2 from moving or rolling backwards in the downhill direction.

If, however, in Step 274, it is determined that vehicle 2 has stopped moving in the uphill direction but sufficient braking torque is provided to retain vehicle 2 in a stationary position while on the uphill terrain, then ABS control module 60 takes control of braking commands in Step 280. Additionally, in Step 280, ABS control module 60 may monitor inputs of braking pressure applied to brake member 54 by the operator and any sensed changed in the G-force, as sensed by multi-axis g sensor 132 (FIG. 9), in the uphill direction. ABS control module 60 also may monitor any input to acceleration member 53 which may be provided to the engine to increase or change engine torque and speed. Also, in Step 280, ABS control module communicates with at least pressure sensor 134, brake pressure switch 126, speed sensors 80, ECM 122, and display 124. Display 124 also may communicate with a portion of powertrain assembly 30, such as the engine and/or transmission (not shown), regarding information of the operating conditions thereof, and ECM 122 may communicate with other components of vehicle 2. In one embodiment, in Step 268, ECM 122 communicates with the engine to determine torque and rpm information and also may communicate with accelerator member 53 (FIG. 2) for electronic throttle control ("ETC").

In Step 282, ESC assembly 160 is configured to appropriately maintain static brake pressure, as applied by the operator, which is the same brake pressure sufficient to hold vehicle 2 in a stationary position for a predetermined amount of time (e.g., 1.0-5.0 seconds and, more particularly, 1.5-3.0 seconds). Alternatively, in Step 282, ESC assembly 160 is configured to maintain static brake pressure until engine torque is applied by the operator, for example through accelerator member 53 (FIG. 2), in an amount which overcomes the braking torque. ABS control module 60 may adjust the pressure upon input from ETC, engine torque, and/or engine speed information through the CAN network or messages.

In Step 284, vehicle 2 may return to the normal run mode in the uphill direction or may roll backwards in the downhill direction if vehicle 2 is maintained on the uphill terrain for a time greater than the predetermined amount of time (e.g., 1.5-3.0 seconds). If vehicle 2 returns to the normal run mode in Step 284, then the HHC Operating Mode returns to Step 272. However, if vehicle 2 begins to roll or move backwards in the downhill direction in Step 284, then the HHC Operating Mode returns to Step 278 to prevent such movement.

Figure 18:
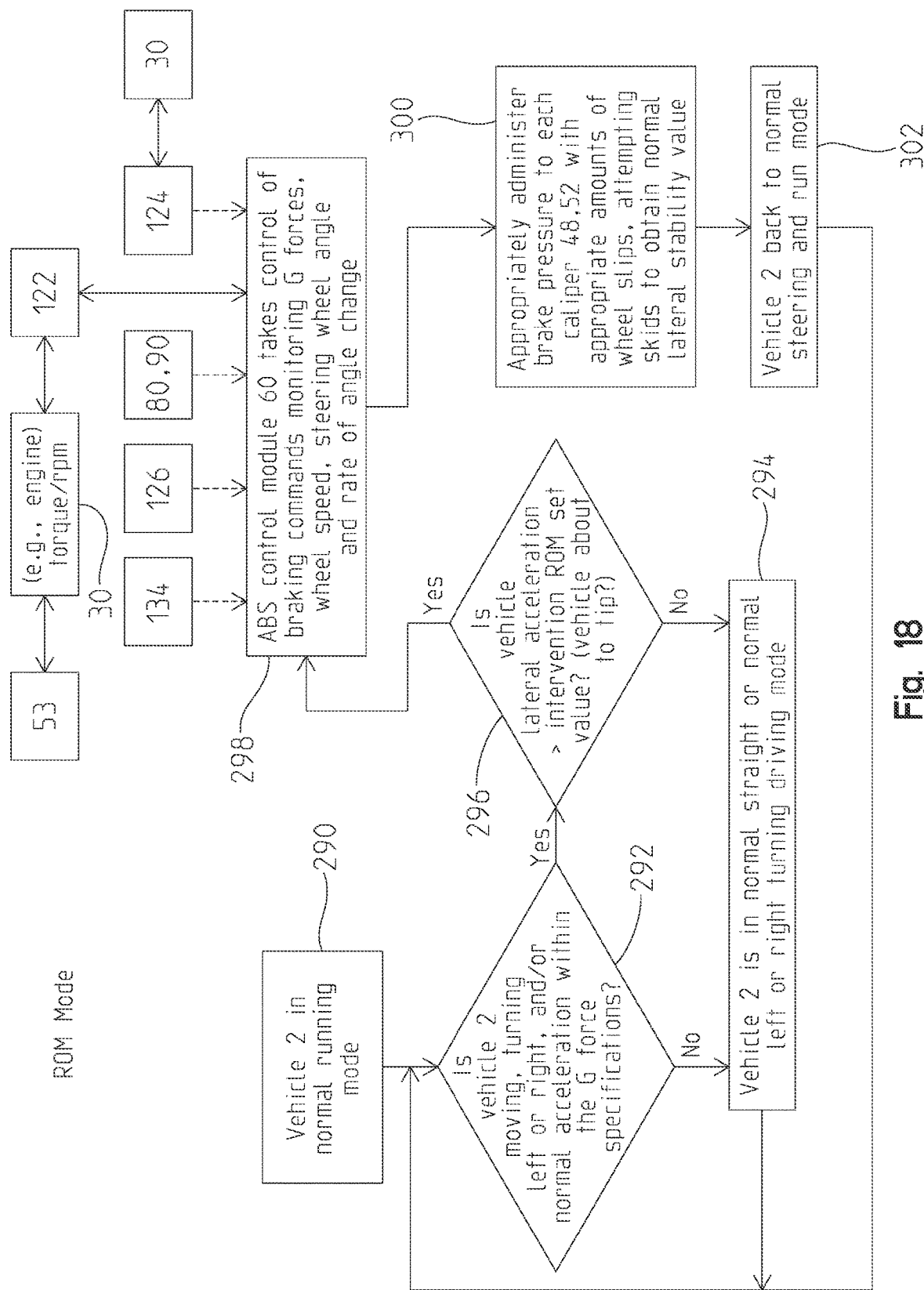
FIG. 18 is a control diagram of the ESC assembly operating in a fourth or Over Mitigation ("ROM") Mode.

Referring to FIG. 18, ESC assembly 160 is configured to operate in a fourth or Roll Over Mitigation ("ROM") Operating Mode. In the ROM Operating Mode, when vehicle 2 is operating in the normal run mode, as shown in Step 290, electrical system 120 may determine if vehicle 2 is moving, turning to the left or right, and/or operating at an acceleration within the G-force specifications for vehicle 2, as shown in Step 292. If electrical system 120 determines that vehicle is not moving, turning to the left or right, and/or operating at an acceleration within the G-force specifications, then vehicle 2 continues to operate in a normal straight, left-turn, or right-turn driving mode, as shown in Step 294.

However, if Step 292 determines that vehicle 2 is moving, turning to the left or right, and/or operating at an acceleration within the G-force specifications for vehicle 2, then Step 296 determines if the lateral acceleration of vehicle 2 is greater than the predetermined or set intervention ROM value. In other words, Step 295 determines if vehicle 2 is likely to tip over. If it is determined that vehicle 2 is likely to tip over, then, in Step 298, ABS control module 50 takes control of braking commands and monitors the G forces, wheel speed, steering angle, and steering angle rate of change using sensors 132, 80 and 90, and 130, respectively. Additionally, in Step 298, ABS control module 60 may communicate with at least pressure sensor 134, brake pressure switch 126, ECM 122, and display 124. Display 124 also may communicate with a portion of powertrain assembly 30, such as the engine and/or transmission (not shown), regarding information of the operating conditions thereof, and ECM 122 may communicate with other components of vehicle 2. In one embodiment, in Step 298, ECM 122 communicates with the engine to determine torque and rpm information and also may communicate with accelerator member 53 (FIG. 2) for electronic throttle control ("ETC").

In Step 300, ABS control module 60 is configured to appropriately administer brake pressure to each of calipers 48, 52 with appropriate amounts of wheel slips to obtain a normal lateral stability value (i.e., a stability value within a predetermined range). 302, vehicle 2 returns to the normal run and steering mode.

Figure 19:
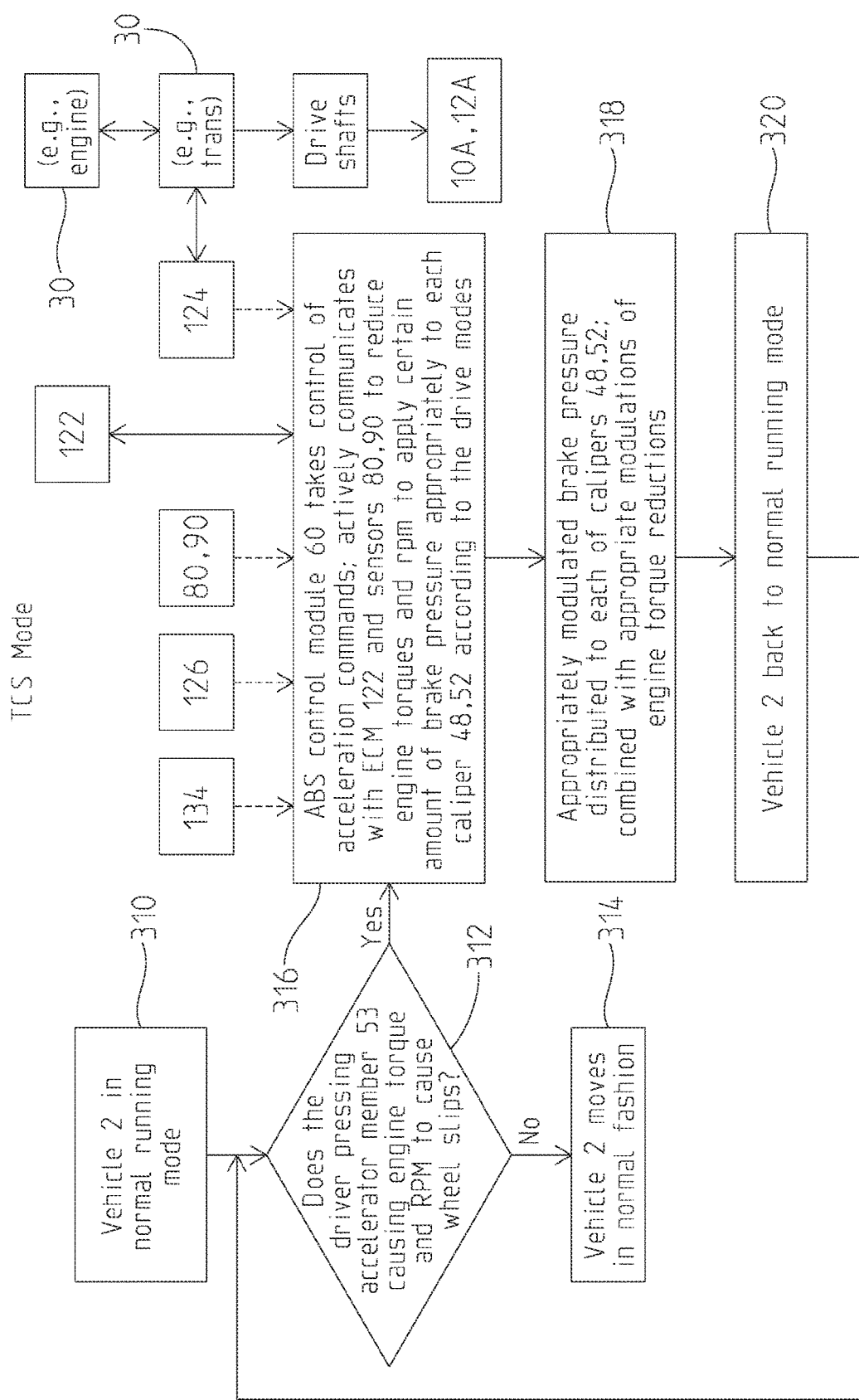
FIG. 19 is a control diagram of the ESC assembly operating in a fifth or Traction Control System ("TCS") Mode.

Referring to FIG. 19, ESC assembly 160 is configured to operate in a fifth or Traction Control System ("TCS") Operating Mode. In the TCS Operating Mode, when vehicle 2 is operating in the normal run mode, as shown in Step 310, electrical system 120 may determine if the operator is applying an input to accelerator member 53 (FIG. 2), thereby causing engine torque and speed to cause wheel slips, as shown in Step 312. If Step 312 determines that the operator is not applying an input to accelerator member 53 in a manner resulting in engine torque and speed causing wheel slips, then vehicle 2 continues to operate in the normal run mode and according to normal driving conditions, as shown in Step 314.

However, if Step 312 determines that the operator is applying an input to accelerator member 53 in a manner resulting in engine torque and speed causing wheel slips, then, in Step 316, ABS control module 60 takes control of acceleration commands and actively communicates with ECM 122 and wheel speed sensors 80, 90 to reduce engine torque and speed. To reduce engine torque and speed, Step 316 applies an amount of braking pressure to each of brake calipers 48, 52 according to different drive modes, such as a Turf or 4×1 mode, a 4×2 mode, 4×4 mode, reverse, and any other type of mode configured for vehicle 2. Additionally, in Step 316, ABS control module 60 may communicate with at least pressure sensor 134, brake pressure switch 126, ECM 122, and display 124. Display 124 also may communicate with a portion of powertrain assembly 30, such as the engine, transmission, drive shafts, and wheel assemblies 10a, 12a (FIG. 2), regarding information of the operating conditions thereof, and ECM 122 may communicate with other components of vehicle 2.

In Step 318, ABS control module 60 appropriately modulates the braking pressure distributed to each of brake calipers 48, 52 in combination with appropriate modulations of engine torque reductions. In Step 320, vehicle 2 returns to the normal run mode and operates according to normal driving conditions.

Figure 20:
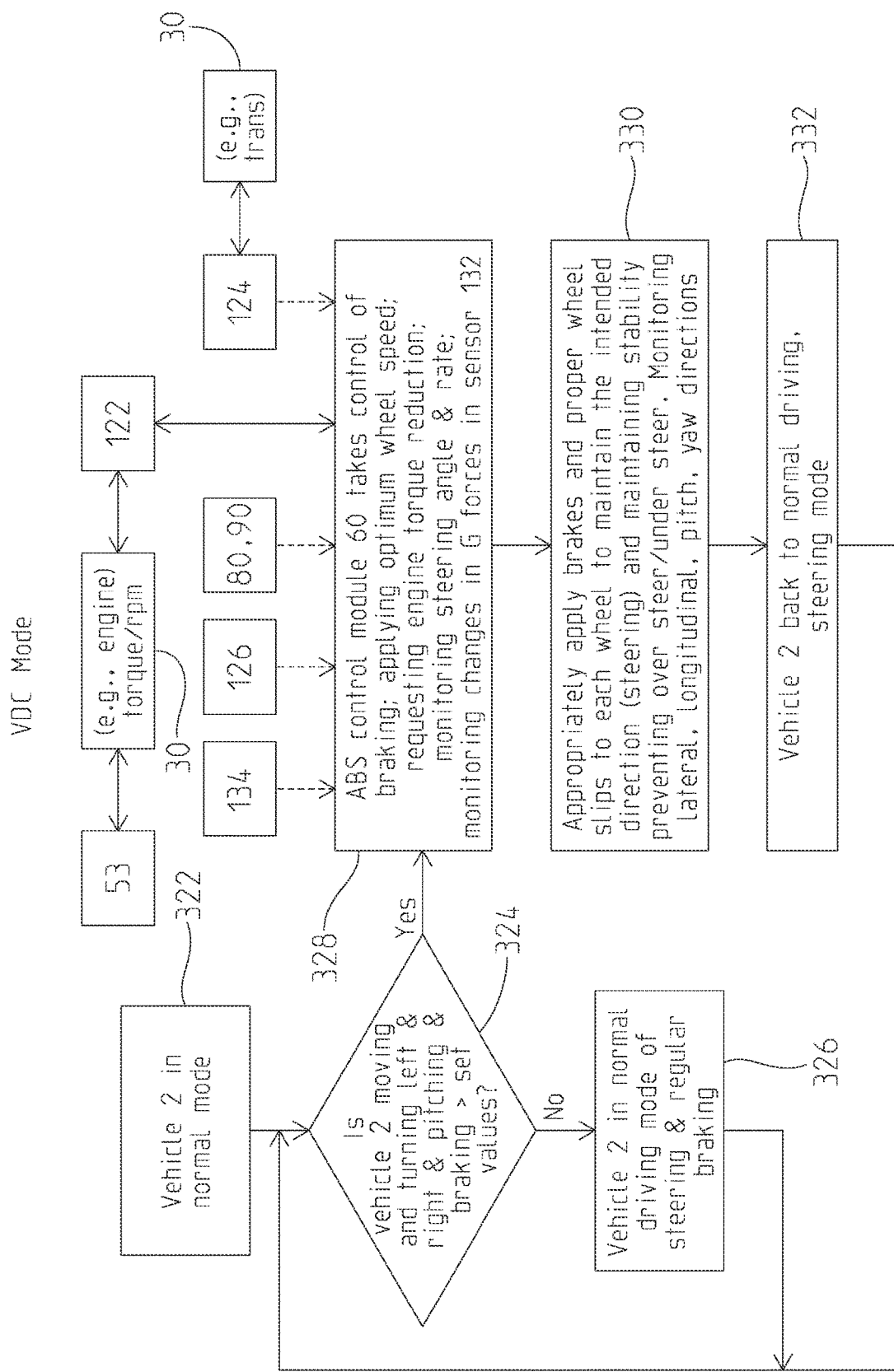
FIG. 20 is a control diagram of the ESC assembly operating in a sixth or Vehicle Dynamic Control ("VFW") Mode.

Referring to FIG. 20, ESC assembly 160 is configured to operate in a sixth or Vehicle Dynamic Control ("VDC") Operating Mode. In the VDC Operating Mode, when vehicle 2 is operating in the normal run mode, as shown in Step 322, electrical system 120 may determine if vehicle 2 is moving, turning to the fight or the left, pitching, and/or braking in a manner less than predetermined values for such operations, as shown in Step 324. If Step 324 determines that vehicle 2 is not moving, turning to the right or the left, pitching, and/or braking in a manner less than predetermined values for such operations, then vehicle 2 operates in the normal run mode and/or according to normal driving conditions with regular steering and braking parameters, as shown in Step 326.

However, if Step 324 determines that vehicle 2 is moving, turning to the right or the left, pitching, and/or braking in a manner less than predetermined values for such operations, then, in Step 328, ABS control module 60 takes control of braking by applying optimum wheel speed parameters using wheel speed sensors 80, 90, More particularly, ABS control module 60 requests engine torque reductions, monitors the steering angle and steering rate using sensor 130, and monitors the changes in G-forces using sensor 132, Additionally, in Step 328, ABS control module 60 may communicate with at least pressure sensor 134, brake pressure switch 126, ECM 122, and display 124. Display 124 also may communicate with a portion of powertrain assembly 30, such as the engine and/or transmission, regarding information of the operating conditions thereof, and ECM 122 may communicate with other components of vehicle 2. In one embodiment, in Step 328, ECM 122 communicates with the engine to determine torque and rpm information and also may communicate with accelerator member 53 (FIG. 2 for electronic throttle control ("ETC").

In Step 330, ABS control module 60 appropriately applies braking pressure and proper wheel slips to each of ground-engaging members 10, 12 to maintain the intended direction (i.e., steering) and to maintain stability, thereby preventing oversteer or understeer. ABS control module 60 also monitors the lateral, longitudinal, pitch, and/or yaw directions. In Step 332, vehicle returns to the normal run mode and/or normal driving, steering, and braking parameters.

Additional details of braking assembly 40 may be disclosed in U.S. patent application Ser. No. 15/471,469, filed. Mar. 28, 2017, and entitled "ANTI-LOCK BRAKE SYSTEM FOR ALL-TERRAIN VEHICLE", the complete disclosure of which is expressly incorporated by reference herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A utility vehicle, comprising:
   a frame;
   a plurality of ground-engaging members supporting the frame and each of the plurality of ground-engaging members is configured to rotate about an axle;
   a powertrain assembly supported by the frame, the plurality of ground-engaging members operably connected to the powertrain in a plurality of drive modes including a 4×2 drive mode and a 4×4 drive mode;
   an anti-lock braking system configured to operate in a first operational mode corresponding to the 4×2 drive mode and a second operational mode corresponding to the 4×4 drive mode; and
   wherein the plurality of ground engaging members are operably connected to the powertrain in at least a third drive mode different from the first drive mode and the second drive mode and the third drive mode is a reverse mode.

2. The utility vehicle of claim 1, wherein the anti-lock braking system is operated through a display positioned on the vehicle.

3. The utility vehicle of claim 1, wherein the anti-lock braking system is configured to reduce engine torque and speed according to the first operational mode or the second operational mode.

4. The utility vehicle of claim 3, further comprising a speed sensor operably coupled to at least one of the plurality of ground-engaging members, the anti-lock braking system configured to actively communicate with the speed sensor in the first operational mode or the second operational mode.

5. The utility vehicle of claim 4, further comprising an engine control module, the anti-lock braking system configured to actively communicate with the engine control module in the first operational mode or the second operational mode.

6. The utility vehicle of claim 1, wherein:
the plurality of ground-engaging members includes:
a first front ground-engaging member;
a second front ground-engaging member;
a first rear ground-engaging member; and
a second rear ground-engaging member; and
the anti-lock braking system includes:
a first front brake caliper operably coupled to the first front ground-engaging member;
a second front brake caliper operably coupled to the second front ground-engaging member;
a first rear brake caliper operably coupled to the first rear ground-engaging member;
a second rear brake caliper operably coupled to the second rear ground-engaging member; and
wherein the anti-lock braking system applies an amount of braking pressure to each of the first front brake caliper, the second front brake caliper, the first rear brake caliper, and the second rear brake caliper according to one of the first operational mode or the second operational mode.

7. The utility vehicle of claim 6, further comprising a plurality of speed sensors respectively operably coupled to each of the plurality of ground-engaging members, the anti-lock braking system configured to actively communicate with the plurality of speed sensors, the first operational mode and the second operational mode operating according to the plurality of speed sensors.

8. The utility vehicle of claim 7, further comprising an engine control module, the anti-lock braking system configured to actively communicate with the engine control module, the first operational mode and the second operational mode operating according to the engine control module.

9. The utility vehicle of claim 1, wherein the plurality of ground-engaging members are operably connected to the powertrain in at least a fourth drive mode different from the first, second and third drive modes.

10. The utility vehicle of claim 9, wherein the fourth drive mode is a 4×1 mode.

11. A method of operating a braking assembly of a utility vehicle including a plurality of brake calipers and an anti-lock braking control module operably coupled to the plurality of brake calipers, the method comprising:
selecting one of a 4×2 drive mode and a 4×4 drive mode; and
engaging the brake calipers via the anti-lock braking control module in a first operational mode when the 4×2 drive mode is selected, or in a second operational mode when the 4×4 drive mode is selected and reducing engine torque and speed according to the first operational mode or the second operational mode.

12. The method of claim 11, wherein the step of selecting comprises selecting one of the first drive mode, the second drive mode, and a third drive mode different from the first and second drive modes.

13. The method of claim 11, further comprising sensing a speed of at least one of a plurality of ground-engaging members of the utility vehicle, and actively communicating between the anti-lock braking control module and the speed sensor in the first operational mode or the second operational mode.

14. The method of claim 13, further comprising actively communicating between the anti-lock braking control module and the engine control module in the first operational mode or the second operational mode.

15. The method of claim 11, wherein the step of engaging the plurality of brake calipers comprises a first front brake caliper, a second front brake caliper, a first rear brake caliper, and a second rear brake caliper, according to one of the first operational mode or the second operational mode.

16. A utility vehicle, comprising:
a frame;
a plurality of ground-engaging members supporting the frame and each of the plurality of ground-engaging members is configured to rotate about an axle;
a powertrain assembly supported by the frame, the plurality of ground-engaging members operably connected to the powertrain in a plurality of drive modes including a 4×2 drive mode and a 4×4 drive mode;
an anti-lock braking system configured to operate in a first operational mode corresponding to the 4×2 drive mode and a second operational mode corresponding to the 4×4 drive mode, wherein the anti-lock braking system is configured to reduce engine torque and speed according to the first operational mode or the second operational mode.

* * * * *